United States Patent
Nishio et al.

[11] Patent Number: 6,072,643
[45] Date of Patent: Jun. 6, 2000

[54] LENS BARREL

[75] Inventors: Kousaku Nishio; Takeshi Ito, both of Hachioji; Shigeo Hayashi, Okaya, all of Japan

[73] Assignee: Olympus Optical Co., Ltd., Tokyo, Japan

[21] Appl. No.: 09/060,394

[22] Filed: Apr. 15, 1998

Related U.S. Application Data

[62] Division of application No. 08/853,830, May 9, 1997, which is a continuation of application No. 08/359,415, Dec. 20, 1994, Pat. No. 5,818,647.

[30] Foreign Application Priority Data

Dec. 21, 1993 [JP] Japan ................................ 5-322185
Dec. 22, 1993 [JP] Japan ................................ 5-325312
Dec. 22, 1993 [JP] Japan ................................ 5-325316
Dec. 27, 1993 [JP] Japan ................................ 5330137
Dec. 27, 1993 [JP] Japan ................................ 5330183

[51] Int. Cl.[7] ................................................. G02B 7/02
[52] U.S. Cl. ............................................. 359/824; 359/822
[58] Field of Search .................................. 359/694–704, 359/819, 822–826

*Primary Examiner*—Georgia Epps
*Assistant Examiner*—Dawn-Marie Bey
*Attorney, Agent, or Firm*—Louis Weinstein

[57] ABSTRACT

A lens barrel of the present invention includes a fixed frame, a plurality of lens groups disposed on the inner circumference of the fixed frame movably along an optical axis direction with respect to the fixed frame, at least three lens holding frames for holding at least one lens group of a plurality of the lens groups, a cam frame having bottomed cam grooves to be coupled with the inner circumference of the fixed frame through cams, bottomed cam grooves across each other to be coupled with the lens holding frames through cams and a bottomed cam groove which is discontinued on one end surface and continued from the other end surface, a key member for regulating the rotation of the lens holding frames about an optical axis with respect to the fixed frame as well as reinforcing the strength of the entire lens barrel, a cam mechanism interposed between the cam frame and the lens holding frames for moving the lens holding frames along the optical axis direction by the rotation of the cam frame about the optical axis with respect to the fixed frame, an internal gear disposed on the inner circumference of the cam frame, a pinion gear for transmitting a drive force from a drive source to the internal gear, flexible printed substrates which are overlapped in a thickness direction with a uniform width so that they are electrically connected to lens frames moving in the optical axis direction, bent to a U-shape and not overlapped each other at the bent portions, rod members provided with the two lens holding frames disposed at both ends along the optical axis of the three lens holding frames, respectively and extending in a direction parallel with the optical axis, and bearings provided with the lens holding frame interposed between the two lens holding frames along the optical axis for receiving the rod members.

10 Claims, 21 Drawing Sheets

LENS BARREL

This application is a divisional of application Ser. No. 08/853,830, filed May 9, 1997 which is a continuation of application Ser. No. 08/359,415, filed on Dec. 20, 1994, now U.S. Pat. No. 5,818,647.

BACKGROUND OF THE INVENTION

1. Field of the Invention

The present invention relates to a lens barrel, and more specifically to a lens barrel having a plurality of lens groups disposed therein so that they can extend and retract in an optical axis direction.

2. Related Art Statement

Conventionally, there are proposed various lens barrels for effecting zooming by moving frames for holding lens groups in an optical axis direction by the rotation of a cam frame accommodated inside a fixed frame.

As an example of such lens barrels, Japanese Patent Application Laid-Open No. 53-102030 discloses a lens barrel provided with two fixed frames, wherein a first lens group is rotated and slid and a cam frame is driven by the rotation thereof to drive the other lens groups. However, the lens barrel disclosed in the publication is disadvantageous in that its structure is complex and many parts are needed and further since the cam frame does not slide, an amount of movement of lenses is determined by the length of the cam frame.

Japanese Utility Model Publication No. 50-14511 discloses a lens barrel including a fixed frame, a cam frame which moves while being rotated along the cam of the fixed frame, and frames driven by the cam frame, wherein means for stopping the rotation of the frames is provided with the fixed frame. In the lens barrel disclosed in the publication, since the fixed frame is provided with a linearly traveling groove and cams for the cam frame, the disposition of the cams is regulated.

In the various kinds of proposed zoom lens barrels, when it is desired to shorten the length of the lens barrel in a retracted state to make the overall size of the lens barrel small, an amount of movement of lens groups is increased and a longer cam frame is needed accordingly.

When the length of a zoom lens barrel is shortened in a retracted state using a short cam frame as in the lens barrel disclosed in Japanese Patent Application Laid-Open No. 3-180822, two mechanisms, i.e., a mechanism for extending a lens frame unit to a certain position and a mechanism for moving the lens barrel to a finally extended position from the above position are needed, thus the arrangement of the zoom lens barrel is made complex.

When a cam frame which is long in an axis direction is used to retract lens groups whose amount of movement is increased, if the balance between the amount of movement of the lenses and the length of the cam frame is lost, the cam frame may remain projected from a lens frame although lenses are accommodated in the lens frame.

In particular, Japanese Patent Application Laid-Open No. 2-247624, for example, discloses a zoom lens barrel as an example of the lens barrels described above which is arranged such that lens holding frames for holding lens groups are each supported by rods.

As shown, for example, in FIG. 1, such a lens barrel sequentially accommodates three lens holding frames 500b, 500c, 500d in this order from the distal end to the proximal end of an optical axis on the inner circumference of a fixed frame 500a. A rod 500e is extended from the lens holding frame 500b of these lens holding frames which is disposed on the distal side of the optical axis to the proximal side of the optical axis and inserted into bearings 500f and 500g, whereby the other lens holding frames 500c, 500d are supported movably in the optical axis direction.

In the lens barrel shown in FIG. 1, however, the rod 500e projects from the space of the lens barrel to the proximal side of the optical axis in a retracted state as shown in FIG. 2. Further, when the length of the rod is shortened to prevent its projection in the retracted state, an amount of movement of the holding frames is reduced, by which the design of the lens barrel is greatly restricted, thus, for example, it is difficult to design a zoom lens barrel having a high magnification.

In the lens barrels disclosed in Japanese Patent Application Laid-Open No. 3-39921, Japanese Patent Application Laid-Open No. 2-213813 and the like, cam grooves are defined to the above cam frame, whereas cam followers are defined to the above holding frames and the cam followers are engaged with the cam grooves of the cam frame to guide the holding frames. With respect to the disposition of the cam grooves defined to the cam frame, any one of the following arrangements is employed: bottomed cams are disposed only on any one of the inner circumference and the outer circumference of the cam frame; only passing-through cams are disposed; or a passing-through cam and a bottomed cam are disposed in combination. Further, bottomed cams are dislocated in an angular direction or in an optical axis direction from an equally divided state so that they do not cross each other.

When bottomed cams are disposed only on any one of the inner circumference and the outer circumference of a cam frame as shown in the relating technologies disclosed in Japanese Patent Application Laid-Open No. 3-39921, Japanese Patent Application Laid-Open No. 2-213813 and the like, the number of cams capable of being disposed on the cam frame and the configuration of the cams are restricted, whereas when a passing-through cam and a bottomed cam are disposed in combination on the cam frame, since these two kinds of cams cannot cross each other, their design is restricted. Therefore, the diameter of the cam frame must be increased or the length thereof in an optical axis direction must be increased, by which the overall dimension of the cam frame is increased. Further, when bottomed cams are disposed so that they do not cross each other, since they must be dislocated in an angular direction or in an optical axis direction from an equally divided state, the overall dimension of the cam frame is also increased.

Further, in the lens barrel which is zoomed in such a manner that the holding frames for the lens groups are moved in an optical axis direction by the rotation of the cam frame accommodated inside the fixed frame, a rotation stop member for the lens holding frames is needed to limit the rotation of the lens holding frames which is caused by the rotation of the cam frame. Japanese Patent Application Laid-Open No. 2-201305 discloses an arrangement provided with a rotation stop member as described above and a reinforcing member for reinforcing the strength of a lens barrel, wherein a linear guide member is disposed as the rotation stop member and a guide ring is disposed as the reinforcing member and these separately provided members achieve the above respective functions. Further, a groove is defined to the frame member whose rotation is desired to be stopped and engaged with the above linear guide member to stop rotation.

When separate members are employed to stop the rotation of holding members and to reinforce the strength of a lens barrel as in the arrangement disclosed in Japanese Patent Application Laid-Open No. 2-201305, the number of parts is naturally increased and the arrangement of the frames is made complex. Further, when a groove is defined to a frame whose rotation is desired to be stopped and rotation is stopped by the engagement of the groove with a rotation stop member, the length of the rotation stop member must be at least one half an amount of movement of the frame. Thus, when the rotation of a frame having a large amount of movement is to be stopped, a longer rotation stop member is needed accordingly. As a result, the rotation stop member projects from the lens barrel in a retracted state, thus the length of the lens barrel cannot be shortened in the retracted state. Conversely, when the length of the lens barrel is shortened in the retracted state, the length of the rotation stop member is also shortened and the rotation of a frame having a large amount of movement cannot be stopped.

Incidentally, there are conventionally proposed various kinds of flexible printed substrate structures having a U-shaped bent portion so that they are accommodated in the aforesaid lens barrel.

For example, Japanese Patent Application Laid-Open No. 64-66995 discloses an example of the flexible printed substrates arranged such that a plurality of flexible printed substrates each having a U-shaped bent portion and attached to relatively moving members are accommodated in the state that the moving loci of the U-shaped bent portions are at least partially overlapped each other to thereby reduce an accommodation space.

In the structure disclosed in Japanese Patent Application Laid-Open No. 64-66995, however, when the relatively moving members are going to move, since a force for straightly extending the flexible printed substrates is applied thereto at the U-shaped portions, the force acts as a resistance to the movement of the relatively moving members. When the flexible printed substrates overlap each other at the U-shaped bent portions where the resistance occurs, the resistance is increased and there is a possibility that the above members cannot be relatively moved.

OBJECT AND SUMMARY OF THE INVENTION

A first object of the present invention is to provide a small lens barrel.

A second object of the present invention is to provide a lens barrel whose length is shortened when it is retracted.

A third object of the present invention is to provide a lens barrel which can achieve a large amount of displacement in an optical axis direction by the smaller number of frame members.

A fourth object of the present invention is to provide a lens barrel which can achieve a large amount of displacement in an optical axis direction by the smaller number of frame members and whose length is shortened when it is retracted.

A fifth object of the present invention is to provide a lens barrel with a sufficient strength which includes lens holding frames having a large amount of movement and whose length is shortened when retracted.

A sixth object of the present invention is to provide a small lens barrel having a cam frame in which a cam groove is effectively disposed in a small space.

A seventh object of the present invention is to provide a lens barrel having a flexible printed substrate structure enabling relatively moving members to smoothly move by reducing a resistance produced at the bent portion of the flexible printed substrate.

When simply described, a lens barrel of the present invention includes a fixed frame, a plurality of lens groups disposed in the inner circumference of the fixed frame and movable along an optical axis direction with respect to the fixed frame, a lens holding frame for holding at least one of the lens groups, a cam frame coupled with the inner circumference of the fixed frame through a cam and moving along the optical axis direction with respect to the fixed frame by being rotated about an optical axis with respect to the fixed frame.

These as well as other objects and advantages of the present invention will become further apparent from the following detailed explanation.

DETAILED DESCRIPTION OF PREFERRED EMBODIMENTS

Embodiments of the present invention will be described below with reference to the drawings.

Figure 1:
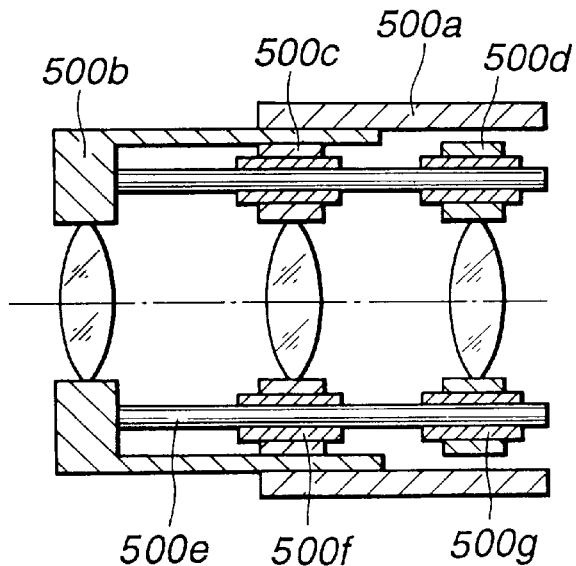
FIG. 1 is a longitudinal cross sectional view along an optical axis showing a state that a conventional lens barrel is extended.
Figure 2:
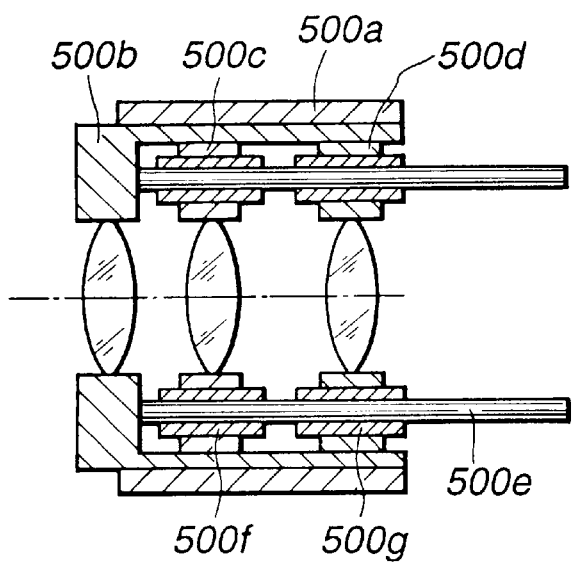
FIG. 2 is a longitudinal cross sectional view along an optical axis showing a state that a conventional lens barrel is retracted.
Figure 3:
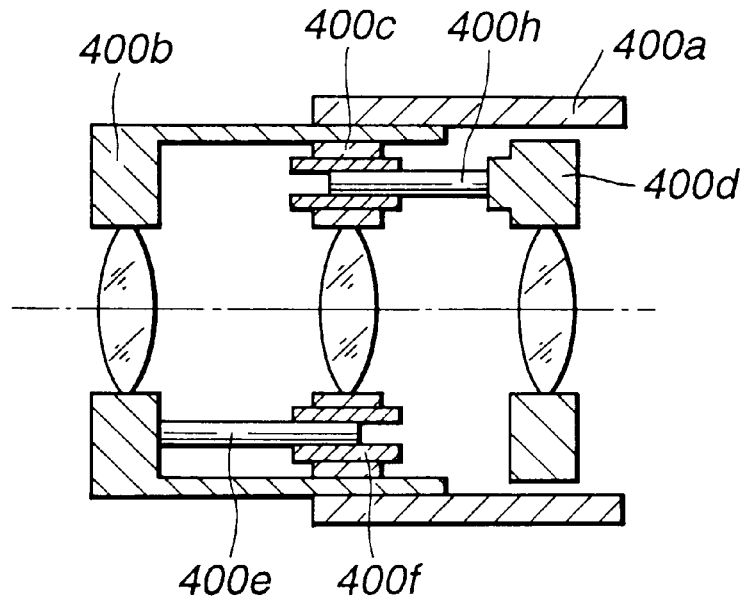
FIG. 3 is a longitudinal cross sectional view along an optical axis schematically showing a state that a lens barrel of an embodiment of the present invention is extended.

First, the concept of a lens barrel in an embodiment of the present invention will be described with reference to examples shown in FIG. 3 and FIG. 4.

The lens barrel accommodates, for example, three lens holding frames 400b, 400c, 400d which are sequentially disposed in this order from the distal side to the proximal side of an optical axis on the inside diameter side of a fixed frame 400a. Of these lens holding frames, a rod member 400e is extended from the lens holding frame 400b disposed on the distal side of the optical axis to the proximal side thereof as well as a rod member 400h is extended from the lens holding frame 400d disposed on the proximal side of the optical axis to the distal side thereof and the lens holding frame 400c can be moved in an optical axis direction by being supported in such an arrangement that the rod members 400e, 400h are inserted into a bearing 400f.

Note, the above rod members 400e, 400h are disposed at the positions substantially equally divided in a circumferential direction (i.e. they lie on a common diameter).

Figure 4:
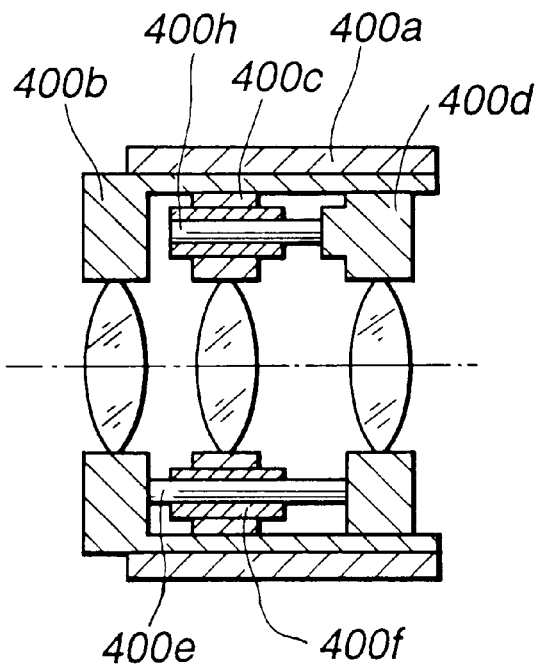
FIG. 4 is a longitudinal cross sectional view along an optical axis showing a state that the lens barrel of FIG. 3 is retracted.

As shown in FIG. 4, this arrangement enables the length of the lens barrel to be shortened when the lens holding frames have a large amount of movement and the lens barrel is retracted in the state that the rod members provided with the lens holding frames do not project from the space of the lens barrel even if it is retracted.

Figure 5:
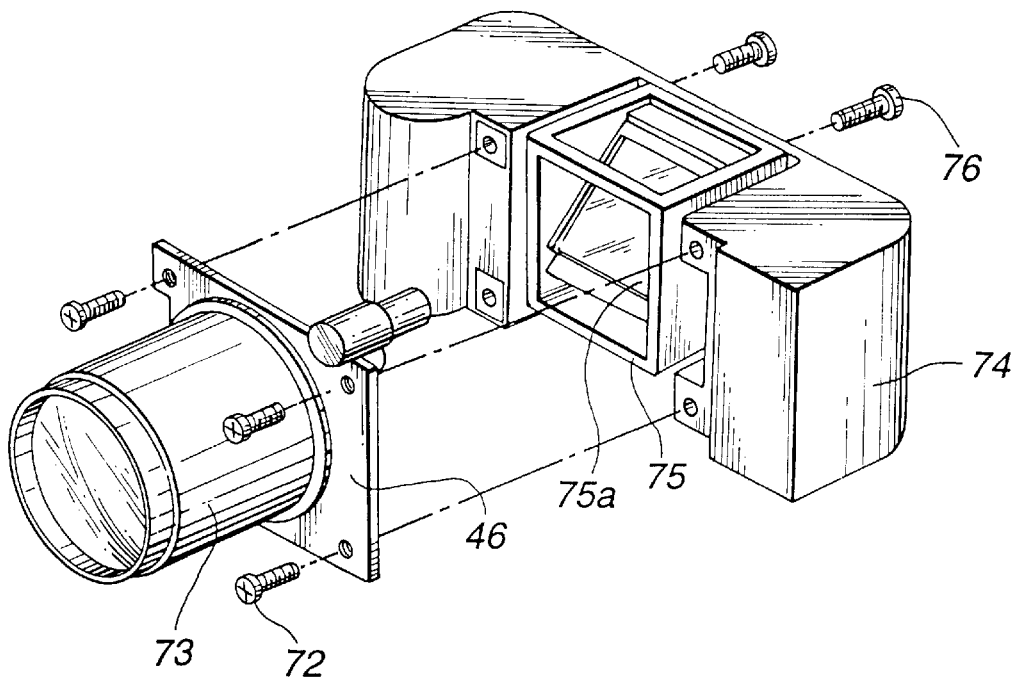
FIG. 5 is a perspective view showing an arrangement for mounting the lens barrel of the above embodiment on a camera body.
Figure 6:
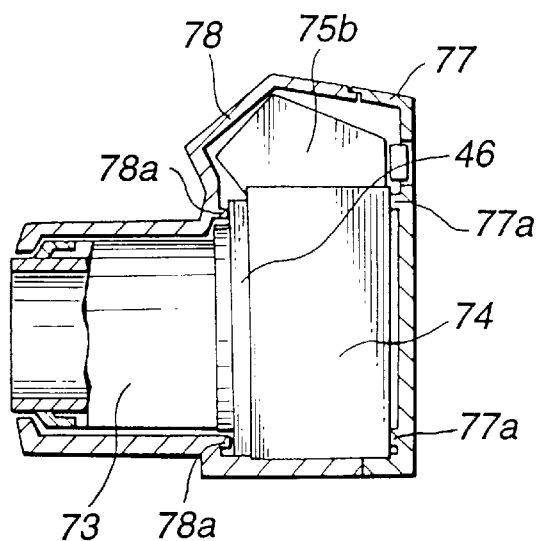
FIG. 6 is a longitudinal cross sectional view showing a camera of the above embodiment.

FIG. 5 is a perspective view showing an arrangement for mounting the lens barrel of the embodiment on a camera body and FIG. 6 is a longitudinal cross sectional view showing a camera.

The camera of the embodiment includes as its main components the camera body 74, a front panel 75 fixed on the front surface of the camera body 74 by screws 76 threaded from rear side of the camera body and having a mirror 75a and a finder 75b, a lens plate 46 fixed to the camera body 74 at a position in front of the front plate 75 by screws 72 threadedly through the lens plate 46, the lens plate 46 having a lens unit 73 disposed on the front surface thereof and reinforcing the strength of the entire lens barrel, a rear cover 77 engaged with the camera body 74 from the rear side thereof so that it is abutted against the camera body 74 through a projection 77a, and a front cover 78 engaged with the lens plate 46 from the front side thereof so that it is abutted against the lens plate 46 through a projection 78a.

Figure 7:
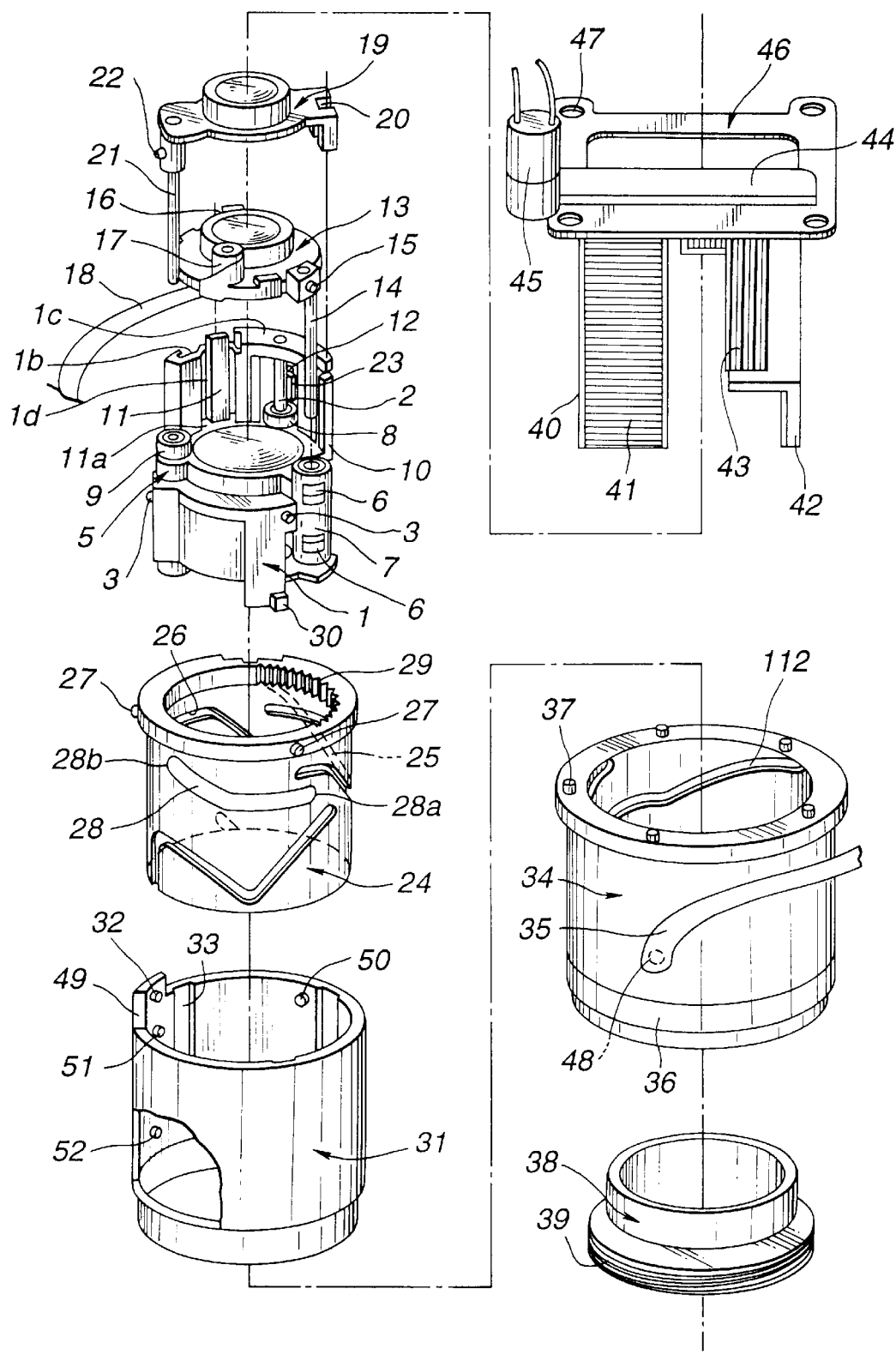
FIG. 7 is an exploded perspective view showing a zoom lens barrel of another embodiment extended in an optical axis direction.
Figure 8:
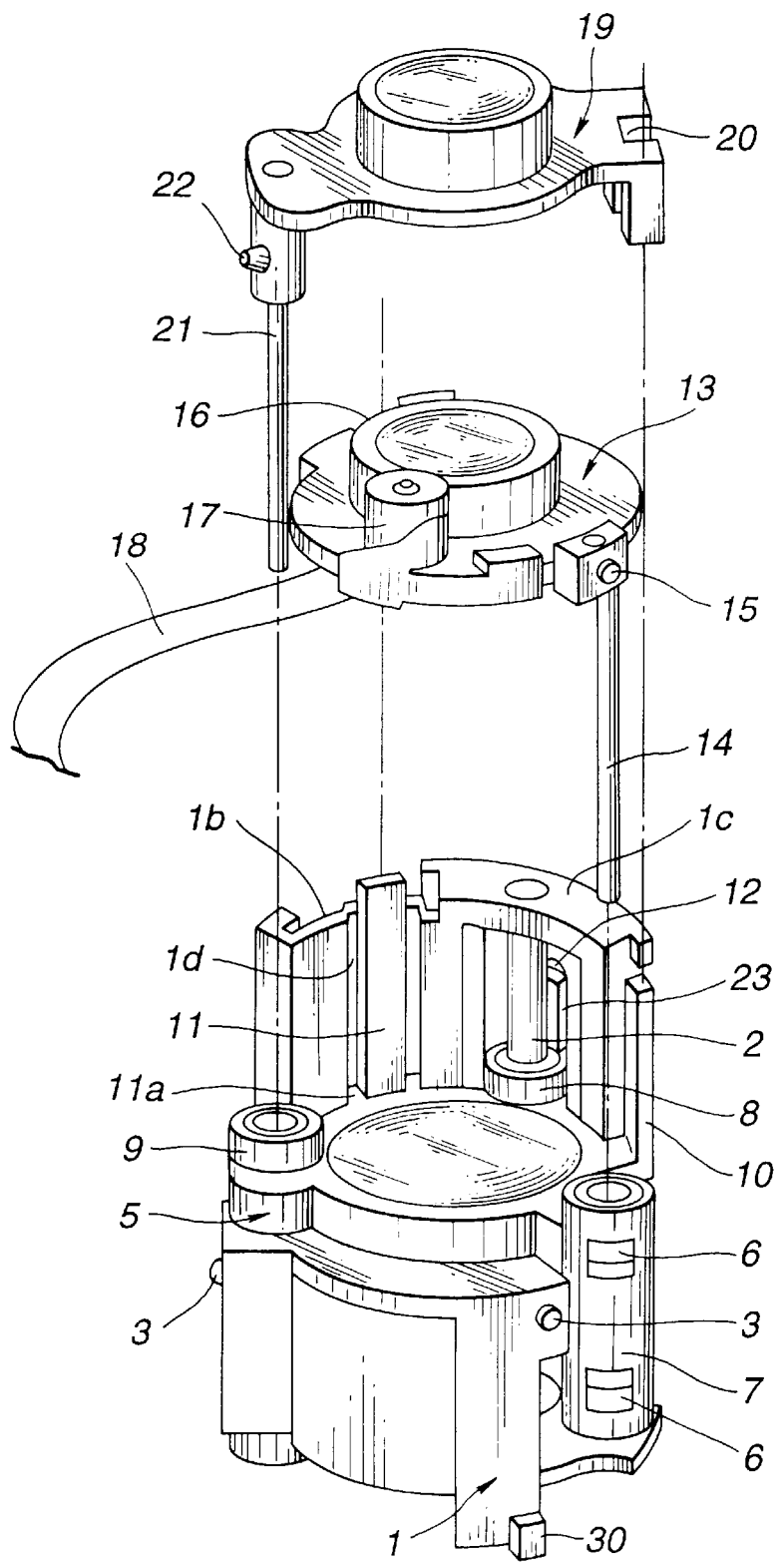
FIG. 8 is an exploded perspective view showing a second group frame, third group frame, fourth group frame and fifth group frame of the above embodiment extended in an optical axis direction.

FIG. 7 is an exploded perspective view showing a zoom lens barrel of another embodiment extended in an optical axis direction and FIG. 8 is an exploded perspective view showing the main portion of lens holding frames.

The zoom lens barrel includes a first group frame 38 for holding a first group lens, a second group frame 1 for holding a second group lens, a third group frame 5 for holding a third group lens, a fourth group frame 13 for holding a fourth group lens and a fifth group frame 19 for holding a fifth group lens which are sequentially disposed in this order from the distal side (object side) of an optical axis along the axis.

A cam frame 24 is disposed on the outer circumferential side of the second group frame 1, the third group frame 5, the fourth group frame 13 and the fifth group frame 19, a first zoom frame 31 which is threadedly engaged with the first group frame 38 through a screw portion 39 is disposed around the cam frame 24 and further a fixed frame 34 is disposed around the first zoom frame 31 and fixedly mounted on the lens plate 46.

The second group frame 1 includes a circumferential-wall-shaped projected portion 1c projecting from the end face of the frame 1 on the proximal side of the optical axis (the camera body side) in the optical axis direction within a predetermined circumferential area. The projected portion 1c has a rotation stop key way 1b defined on the outer circumference thereof and a key way 1d defined on the inner circumference thereof each in parallel with the optical axis and a rod 2 extending in the optical axis direction. The second group frame 1 has three pins 3 which project from it integrally therewith to the outside and are located at the positions shown and are equally divided in the circumferential direction of the frame 1. Three projections 30 are formed with respect to the pins 3 at the positions substantially equally divided in a circumferential direction on the distal side of the optical axis (the object side). The second group frame 1 further has a key way 1a parallel with the optical axis (refer to FIG. 9).

The third group frame 5 has substantially cylindrical bearings 7, 8, 9 disposed at the positions substantially equally divided in a circumferential direction, respectively, each of the bearings having sleeves 6 at both ends thereof. The bearing 8 of these bearings has a projection 23 projecting on the proximal side in the axis direction (on the camera body side) and the projection 23 has a pin 12 projecting outwardly and integrally formed therewith. Further, the third group frame 5 has a guide projection 10 disposed at a position between the bearing 7 and the bearing 8 in a circumferential direction and extending to the proximal side in the optical axis direction and a guide projection 11 disposed at a position between the bearing 8 and the bearing 9 and extending to the proximal side in the optical axis direction.

The fourth group frame 13 has a pin 15 projecting from the circumference thereof outwardly and formed integrally therewith and a rotation stopping groove 16 defined to the circumference thereof. Further, a rod 14 directed to the distal side of the optical axis in parallel therewith is attached to the fourth group frame 13 and the groove 16 and the rod 14 are disposed at the positions substantially equally divided in a circumferential direction. In addition, the fourth group frame 13 has a stepping motor 17 for adjusting a diaphragm and a band-shaped substrate 18 is extended from the stepping motor 17.

The fifth group frame 19 has a pin 22 integrally formed therewith and extending outwardly and a rotation stop groove 20 defined thereto. Further, a rod 21 directed to the distal side of the optical axis in parallel therewith is attached to the outer circumference of the fifth group frame 19 and the groove 20 and the rod 21 are disposed at the positions substantially equally divided in a circumferential direction.

Note, when these rods 2, 14 and 21 are made to have the same diameter, respectively, the bearings corresponding to them can be also made to have the same diameter, by which a manufacturing cost can be reduced.

The cam frame 24 is a cylindrical member having several bottomed cams 26 which constitute a cam mechanism and are defined on the inner circumference thereof and an internal gear 29 is partially formed on the inner circumference of the cam frame 24 at the end on the proximate side of the optical axis (on a photographer side) thereof. Further, several bottomed cams 25 constituting a cam mechanism are also defined on the outer circumference of the cam frame 24 as well as an encoder 28 which is mounted thereon and three pins 27 integrally project from the end on the proximal side of the optical axis of the cam frame 24.

The first zoom frame 31 has three linearly traveling grooves 33 defined on the inner circumference thereof at the positions equally divided in a circumferential direction, respectively. Further, pins 50, 51, 52 integrally project from the inner circumference of the first zoom frame 31 as well as a substantially rectangular projection 49 extends from the proximal end on the inner circumference of the frame 31 and a pin 32 separate from the first zoom frame 31 is disposed upon the projection 49.

The fixed frame 34 is a cylindrical member having cams 112 on the inner circumference thereof and a ring 36 is engaged with the fixed frame 34 at the end thereof on the distal side in the optical axis direction and a substrate 35 having a photoreflector (PR) 48 is attached on the outer circumference of the fixed frame 34. Further, several bosses 37 are spaced about and project from the proximate end circumferential surface in the optical axis direction of the fixed frame 34 along a circumferential direction.

The lens plate 46 is composed of a sheet-shaped member having holes 47 defined at the four corners thereof and has a key 40 serving as a reinforcing member and a key 42 serving as a similar reinforcing member attached thereto in such a manner that they are vertical with respect to the front surface of the lens plate 46. A multiplicity of thin light shield grooves 41 are defined in the key 40 perpendicular to the optical axis and a pinion gear 43 extending in the optical axis direction is mounted on the key 42. Further, a zoom motor 45 as a drive source and a second gear box 44 having a gear train for transmitting a drive force from the zoom motor 45 are mounted on the lens plate 46. The final gear of the gear train is meshed with the pinion gear 43 mounted on the key 42.

Next, the alignment of the respective lens holding frames will be described below.

The third group frame 5 is movable in the optical axis direction with respect to the second group frame 1 by the arrangement that the rod 2 is inserted into the bearing 8 and further the position in the radial direction of the third group frame 5 is determined with respect to the second group frame 1 by the bearings 7, 9 which regulate the radial direction.

The fourth group frame 13 is movable in the axis direction with respect to the third group frame 5 by the arrangement that the rod 14 is inserted into the bearing 7 and further the position in the radial direction of the fourth group frame 13 is determined with respect to the third group frame 5 by the groove 16 engaged with the guide projection 11.

The fifth group frame 19 is movable in the axis direction with respect to the third group frame 5 by the arrangement that the rod 21 is inserted into the bearing 9 and further the position in the radial direction of the fifth group frame 19 is determined with respect to the third group frame 5 by the groove 20 engaged with the guide projection 10.

More specifically, the respective lens holding frames are aligned with each other in such a manner that the fourth group frame 13 and the fifth group frame 19 are positioned with respect to the third group frame 5 and the third group frame 5 is positioned with respect to the second group frame 1.

Further, the other frame members are aligned as described below.

The position in the radial direction of the cam frame 24 is determined in such a manner that the pins 3, 12, 15, 22 are engaged with the cam 26 on the inner circumference of the can frame 24.

Further, the position in the radial direction of the cam frame 24 is determined in such a manner that the pin 50 of the first zoom frame 31 is engaged with the cam 25 and the position in the radial direction of the second group frame 1 is determined in such a manner that the projections 30 at the three positions are engaged with the linearly traveling grooves 33 at the three positions of the first zoom frame 31, respectively with respect to the first zoom frame 31. The position of the first group frame 38 is determined in such a manner that the screw portion 39 is threadedly engaged with the extreme end of the first zoom frame 31.

The position in the radial direction of the cam frame 24 is determined with respect to the fixed frame 34 in such a manner that the three pins 27 are engaged with the cams 112 at the three positions of the fixed frame 34.

The position of the fixed frame 34 is determined by fitting the bosses 37 to the lens plate 46 and the rotation of the second group frame 1 about the optical axis is regulated by fitting the key 40 to the key way 1*b* of the second group frame 1.

Since the respective lens holding frames are supported as described above, the length of the lens barrel in its retracted state is substantially made equal to the sum of the lengths in the axial direction of the second group frame 1, the third group frame 5, the fourth group frame 13 and the fifth group frame 19, so that the length in the optical axis of the lens barrel can be remarkably shortened.

Figure 9:
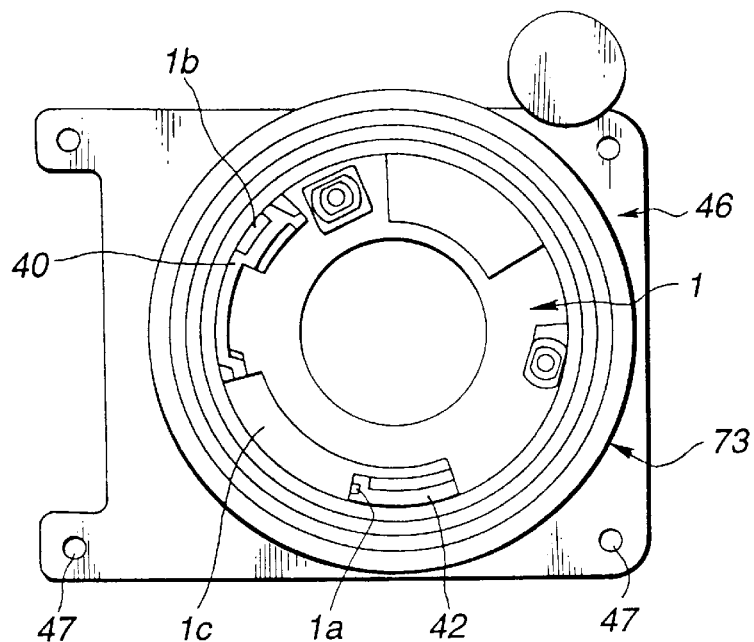
FIG. 9 is a front view showing a lens unit mounted on a lens plate of the above embodiment.
Figure 10:
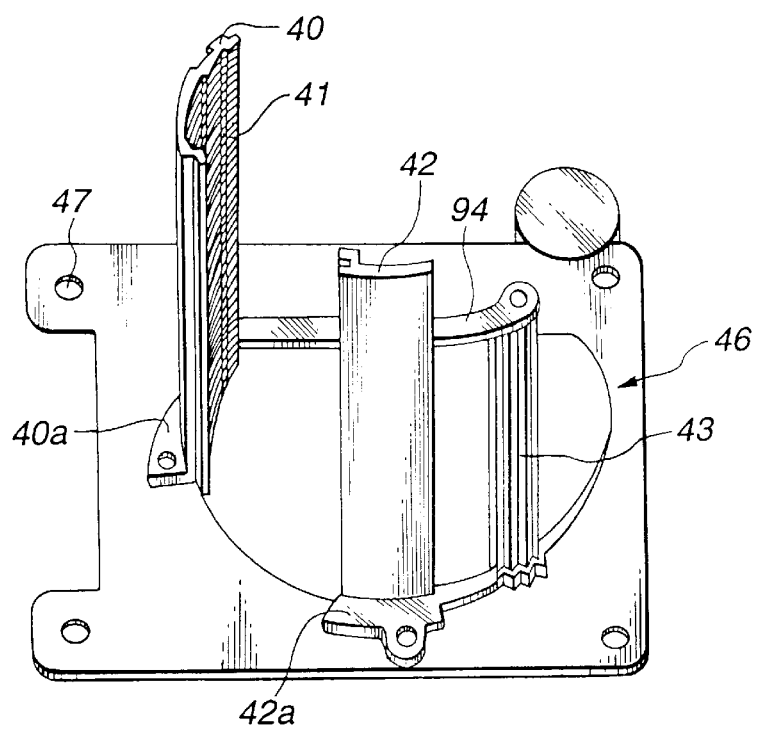
FIG. 10 is a perspective view showing a key mounted on the lens plate of the above embodiment.

FIG. 9 is a front view of the lens unit 73 mounted on the lens plate 46 and FIG. 10 is a perspective view showing the keys 40, 42 mounted on the lens plate 46.

As described above, the keys 40, 42 extending to the distal side of the optical axis in parallel therewith are fixed on the front surface of the lens plate 46 through key mounting units 40*a*, 42*a* provided with the keys 40, 42.

A light shield groove is also defined on the inside of the key 42 similar to the key 40 and an arm 94 circumferentially extends from the key 42. The arm 94 has a pinion gear 43 with a long shaft disposed thereon, the pinion gear 43 is held between the arm 94 and the lens plate 46 and the lower portion of the pinion gear 43 has a different gear diameter.

Since there is a possibility that the pinion gear 43 may bend because it is a long, it is made of metal to avoid the bending.

The key 40 and the key 42 are fitted to the key ways 1b, 1a defined on the second group frame 1, respectively to regulate the rotation of the second group frame 1. Further, since these keys 40, 42 are made of metal, they can also reinforce the lens unit 73.

The key 40 and the key 42 can be formed from, for example, an aluminium diecast product, zinc diecast or the like and the respective components of the frame members including the second group frame 1 and the like may be molded by a plastic material or the like which is lighter and less rigid, by which the key 40 and the key 42 substantially assure the rigidity of the entire lens unit 73 and serve as a reference when the respective components of the lens barrel are positioned.

Note, the rotation of the first zoom frame 31 about the optical axis is regulated in such a manner that the three linear traveling grooves 33 which are disposed on the inner circumference of the first zoom frame 31 and parallel with the optical axis direction are engaged with the three projections 30 disposed on the outer circumference of the second group frame 1 on the distal side of the optical axis.

Figure 11:
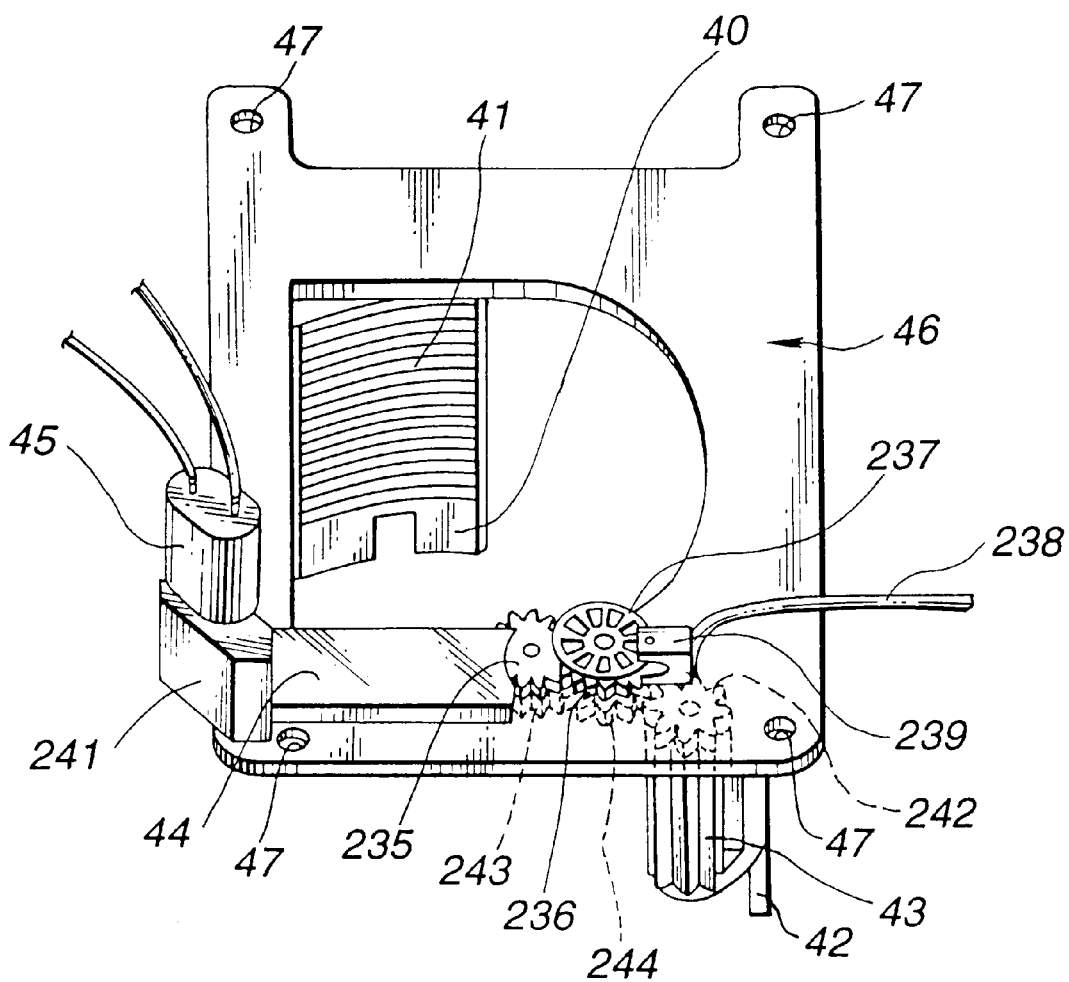
FIG. 11 is a perspective view showing the lens plate of FIG. 10 from the opposite side thereof.

Next, the arrangement of a zoom gear mounted on the lens plate 46 will be described with reference to FIG. 11.

The above key 40 for regulating the rotation of the second group frame 1 about the optical axis and the long shaft pinion gear 43 for rotating the cam frame 24 are mounted on the front surface (the lower surface in FIG. 11) of the lens plate 46 on which the lens barrel is fixed. Further, the zoom motor 45, a first gear box 241 containing three-staged planetary gear mechanisms and the second gear box 44 containing the train of external gears, are mounted on the rear surface (the upper surface in FIG. 11) of the lens plate 46.

The zoom motor 45 constitutes the first stage planetary gear mechanism in the first gear box 241 using a pinion gear mounted on the output shaft thereof as a sun gear.

A carrier on the final stage in the first gear box 241 is meshed with the external gear in the second gear box 44 and transmits a drive force through a gear 235 meshed with a gear 236 which has a disk 237 integrally disposed on the rear surface thereof and is rotated therewith, the disk having a plurality of slits defined therethrough in its circumferential direction.

The gear 235 is integrally and coaxially provided with a gear 243 having a different diameter on the front surface thereof. In addition, there is provided an idle gear 244 which is meshed with the gear 243 and further meshed with a gear 242 mounted on the base end portion of the pinion gear 43 and having a different diameter.

Further, a C-shaped photointerrupter (PI) 239 is disposed and holds the disk 237 therebetween and a flexible substrate 238 is attached to the photointerrupter 239.

When the zoom motor 45 rotates, the planetary gear mechanisms in the first gear box 241 are driven and successively the gear train in the second gear box 44 is driven. Further, the gear 236 and the disk 237 are rotated through the gear 235.

When the slits of the disk 237 pass through the photointerrupter 239, light passes through the slits and signals flow to the flexible substrate 238. On the other hand, when the portion of the disk 237 without the slits passes therethrough light is interrupted and no signal flows to the flexible substrate 238. Therefore, when the disk 237 rotates, a pulse wave flows to the flexible substrate 238.

On the other hand, when the gear 243 is rotated by the rotation of the gear 235, the gear 242 is rotated through the gear 244 and the long shaft pinion gear 43 is driven in rotation accordingly.

As shown in FIG. 7, since the pinion gear 43 is meshed with the internal gear 29 of the cam frame 24 and the pins 27 of the cam frame 24 are meshed with the cams 112 of the fixed frame 34 at the three positions, when the pinion gear 43 rotates, the cam frame 24 is moved forwardly along the cams 112 while rotating about the optical axis.

The rotation about the optical axis of the second group frame 1, the third group frame 5, the fourth group frame 13 and the fifth group frame 19 is regulated by the key 42, they move forward and backward along the cam 26 on the inner circumference of the cam frame 26 in an axial direction without being rotated.

The photoreflector 48 of the substrate 35 attached to the fixed frame 34 is provided with a light emitting element and a light receiving element and light emitted from the light emitting element is reflected on the outer circumference of the cam frame 24 and incident on the light receiving element. Since the encoder 28 mounted on the cam frame 24 has a light reflectance ratio which is larger than that of the other portion of the circumference of the cam frame 24, when the encoder 28 passes through a position corresponding to the photoreflector 48, signals output from the photoreflector 48 are changed.

When the cam frame 24 rotates, W+1 (a few pulses after the wide (WIDE) end) is supposed to be a time at which an end 28a of the encoder 28 passes through the photoreflector 48, T−1 (a few pulses before the telephoto (TELE) end) is supposed to be time at which the other end 28b of the encoder 28 passes through the photoreflector 48 and the photointerrupter 239 is reset at these times.

When the lens barrel is zoomed from its retracted position to the wide end or the telephoto end or from a standard (STD) end to the wide end or the telephoto end, the lens barrel is caused to surely pass through the reset position of the photointerrupter 239 and the dispersion of the pulses of the photointerrupter 239 resulting from backlash is eliminated. As a result, zooming can be carried out so that the cam frame 24 stops at an accurate position.

Figure 12:
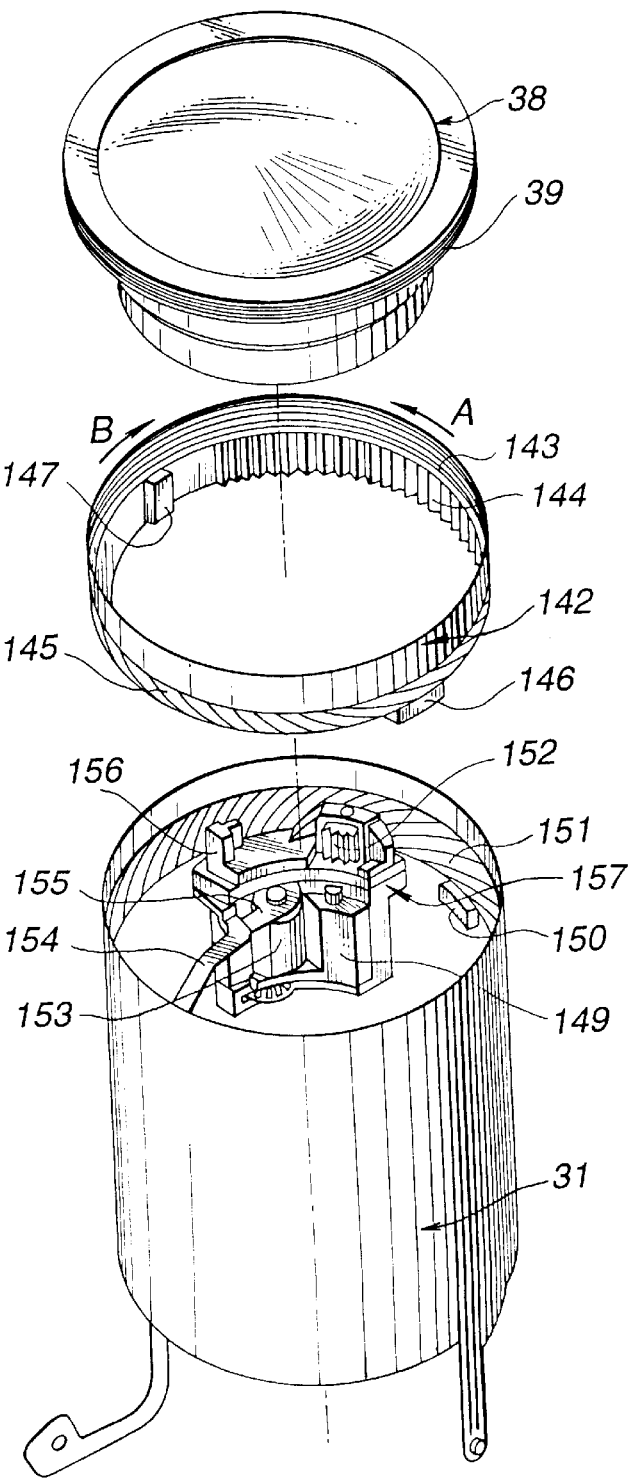
FIG. 12 is an exploded perspective view showing a first zoom frame, screw frame, and first group frame of the above embodiment extended in an optical axis direction.

FIG. 12 is an exploded perspective view showing a lens drive unit 157 provided with the first zoom frame 31, a screw frame 142 and the first group frame 38 by extending them in an optical axis direction.

As shown in FIG. 12, the first group frame 38 having the screw portion 39 formed on the outer circumference thereof is disposed forwardly of the screw frame 142 and the first zoom frame 31 having the lens drive unit (LD unit) 157 located on the inner circumference thereof is disposed rearwardly of the screw frame 142.

The screw frame 142 has a screw portion 143 defined at the extreme end on the inner circumference thereof, an internal gear 144 defined in a predetermined range at the rear end on the inner circumference along its circumferential direction and a helicoid 145 defined at the rear end of the outer circumference thereof along its circumferential direction. Further, the screw frame 142 has two projections 146, 147 in the vicinity of the terminal end of the internal gear 144. One of the projections 147 projects in the inside diameter direction of the screw frame 142 and the other projection 146 projects toward the proximal side of the optical axis.

On the other hand, the lens drive unit 157 mounted on the inner circumference of the first zoom frame 31 includes a motor 153 as a drive source, a gear box 149 containing a gear train for reducing a drive force from the motor 153 and a gear 152 to which an output from the gear box 149 is transmitted, and an LD flexible substrate (lens drive flexible substrate) 155 is attached to the motor 153. Further, the lens drive unit 157 has a projection 156 projecting toward the front side of the first zoom frame 31 along the axis thereof.

Further, the first zoom frame 31 has a helicoid 151 defined on the front side of the inner circumference thereof along its circumferential direction and a projection 150 projecting in an inside diameter direction is formed at an edge portion of the helicoid 151 and further an arm 154 is disposed on the inside of the first zoom frame 31 to guide the LD flexible substrate 155.

The first group frame 38 is mounted on the screw frame 142 through the screw portion 39 thereof threadedly engaged with the screw portion 143 of the screw frame 142 and the screw frame 142 is mounted on the first zoom frame 31 through the helicoid 145 thereof threadedly engaged with the helicoid 151 of the first zoom frame 31.

When a focusing operation is carried out in the arrangement shown in FIG. 12, the motor 153 is driven to rotate the gear 152 through the gear train in the gear box 149. Since the gear 152 is meshed with the internal gear 144 in the screw frame 142, the screw frame 142 is rotated by the rotation of the gear 152 and moved along the helicoid 151 in the optical axis direction as well as the first group frame 38 is also extracted, so that the focusing operation is carried out.

When focusing is effected to an object very near to the camera, the screw frame 142 rotates in the direction of an arrow B so that the projection 147 is butted against the projection 156 of the first zoom frame 31 and acts as a stopper.

Further when focusing is effect to an object at an infinite distance, the screw frame 142 rotates in the direction of an arrow A so that the projection 146 is abutted against the projection 150 to act as a stopper.

Figure 13:
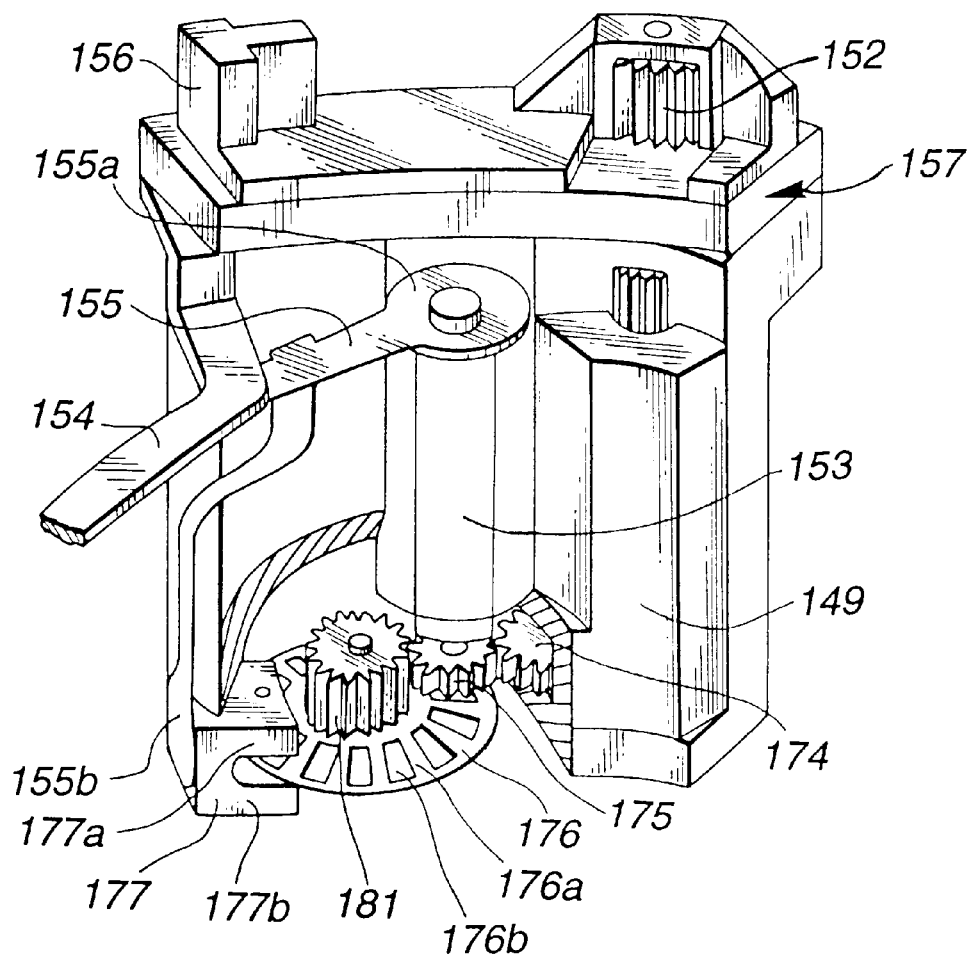
FIG. 13 is an enlarged perspective view showing a lens drive unit of the above embodiment in detail.

FIG. 13 shows the lens drive unit 157 in detail.

The lens drive unit 157 includes the motor 153 as the drive source, a pinion gear 175 mounted on the output shaft of the motor 153, two gears 181, 174 meshed with the pinion gear 175, the gear box 149 employing two-staged planetary gear mechanisms for transmitting a drive force from the gear box 149, the gear 152 to which an output from the gear box 149 is transmitted to rotate the screw frame 142, a disk 176 having a plurality of slits 176b circumferentially arranged to and disposed on the lower surface of the gear 181 in the figure and a C-shaped photointerrupter 177 disposed to hold the disk 176 vertically.

An end of the LD flexible substrate 155 is divided into two ends and one of them 155b is attached to the photointerrupter 177 and the other end 155a is attached to the motor 153. The LD flexible substrate 155 is attached to the arm 154 circumferentially extending from the lens drive unit 57 and supported thereby.

When the lens drive unit 157 is driven, power is fed to the motor 153 through the LD flexible substrate 155 first and when the motor 153 rotates, the gears 181, 174 are rotated by the pinion gear 175.

The drive force of the gear 174 is transmitted to the gear 152 through the gear box 149. Since the gear 152 is meshed with the internal gear 144 disposed on the screw frame 142, the screw frame 142 is rotated to carry out focusing as described above.

Further, when the gear 181 rotates, the disk 176 is also rotated. Since one of the two projections 177a, 177b of the C-shaped photointerrupter 177 is provided with a light emitting element and the other is provided with a light receiving element, when the slits 176b pass between the projection 177a and the projection 177b of the photointerrupter 177, light emitted by the light emitting element is received by the light receiving element and an electric power generated by the photo-to-electro conversion executed by the light receiving element is transmitted to the end 155b of the LD flexible substrate 155. On the other hand, when the portion 176a of the disk 176 without the slits passes between the projection 177a and the projection 177b of the photointerrupter 177, since light emitted from the light emitting element is interrupted and no electric power is generated in the light receiving element, no electric power is transmitted to the end 155b of the LD flexible substrate 155.

Therefore, a pulse wave flows to the end 155b of the LD flexible substrate 155 by the rotation of the disk 176. The number of the pulses is counted by a not shown counter and counting is executed by counting an instant at which an electric current flows to the motor 153 from a nearest state as a zero pulse.

Further, focusing is controlled to stop the screw frame 142 at a position to be focused without error in such a manner that a voltage imposed on the motor 153 is reduced a few pulses before the position so that a brake is applied after the rotational speed of the motor 153 is reduced.

Figure 14:
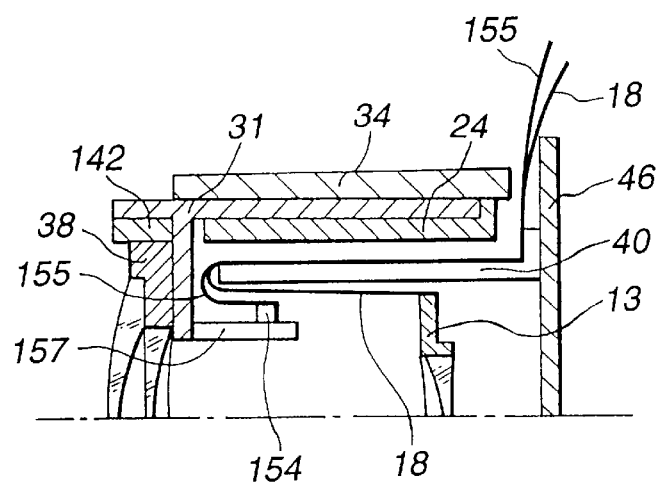
FIG. 14 is a cross sectional view schematically showing the upper half portion on an optical axis of the lens barrel of the above embodiment.

As shown in FIG. 14, the lens barrel of the aforesaid embodiment includes the fixed frame 34 which does not move at the times when zooming is effected and the like, the first zoom frame 31 disposed on the inner circumference of the fixed frame 34 and having the lens drive unit 157 mounted thereon, the cam frame 24 disposed on the further inner circumference of the first zoom frame 31, the screw frame 142 disposed on the inner circumference of the first zoom frame 31 on the front side thereof, the first group frame 38 mounted through the screw frame 142, the fourth group frame 13 with a not shown diaphragm disposed inwardly of the cam frame 24 behind the first group frame 38, the lens plate 46, which is composed of the substantially rectangular sheet member and has the fixing holes at the four corners thereof, disposed behind the fixed frame 24 to fix the same perpendicularly to the optical axis (also refer to FIG. 16) and the key 40 disposed between the cam frame 24 on the front side of the lens plate 46 and the fourth group frame 13 to regulate the rotation of the lens barrel.

Further, the lens barrel includes a flexible printed substrate for diaphragm 18 having an end connected to the diaphragm of the fourth group frame 13 and the lens driving flexible printed substrate 155 for executing focusing having an end connected to the lens drive unit 157.

These two flexible printed substrates 18, 155 enter the lens barrel from the outside thereof through a gap between the lens plate 46 and the fixed frame 34, travel along the lens plate 46 toward the optical axis at the center of the lens barrel in an overlapped state, are bent forwardly on the outer circumference side of the key 40, extend forwardly along the guide groove 40b defined to the key 40 (refer to FIG. 16) and are bent into a U-shape rearwardly in the vicinity of the front side of the extreme end of the key 40.

The flexible printed substrate 155 is guided by the arm 154 (refer to FIG. 16) substantially circumferentially extended from the lens drive unit 157.

The flexible printed substrate for diaphragm 18 is bent rearwardly after passing through the U-shaped bent portion and then connected to the stepping motor 17 (refer to FIG. 7) disposed on the front side the fourth group frame 13 and a not shown photointerrupter.

On the other hand, after the lens drive flexible printed substrate 155 passes through the U-shaped bent portion, it is connected to the motor 153 provided with the lens drive unit 157 and the photointerrupter 177 while supported by the arm 154 substantially circumferentially extending from the lens drive unit 157.

Figure 15:
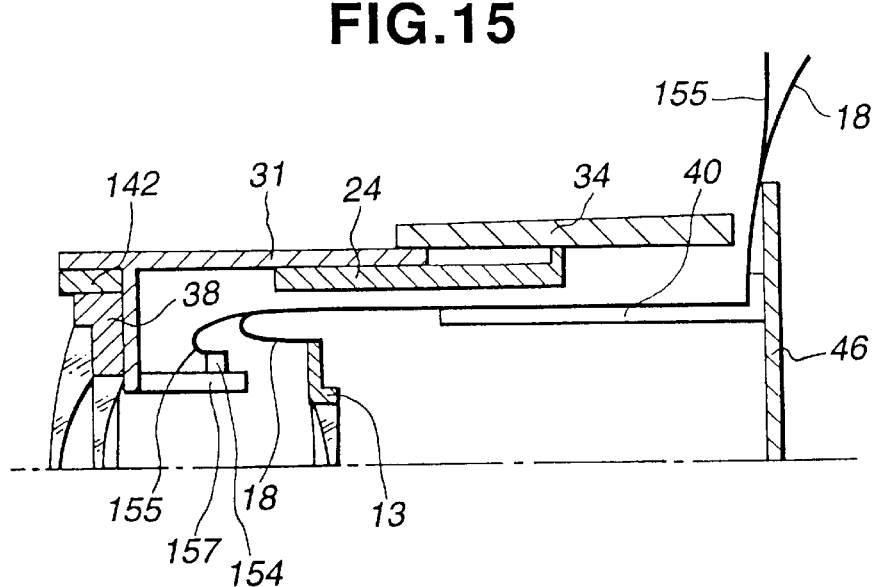
FIG. 15 is a cross sectional view showing the upper half portion on an optical axis of the lens barrel of the above embodiment when it is zoomed.

When the lens barrel as described above is zoomed, the cam frame 24 is extended with respect to the fixed frame 34 and the first zoom frame 31 is extended with respect to the fixed frame 34 and also with respect to the cam frame 24, as shown in FIG. 15. Thus, the fourth group frame 13 is relatively extended with respect to the respective frames 34, 24 and 31 as shown in the figure.

When the zooming operation is effected as described above, the U-shaped bent portions of the flexible printed substrate for diaphragm 18 and the lens drive flexible printed substrate 155 are moved forwardly and disposed as shown in FIG. 15.

Figure 16:
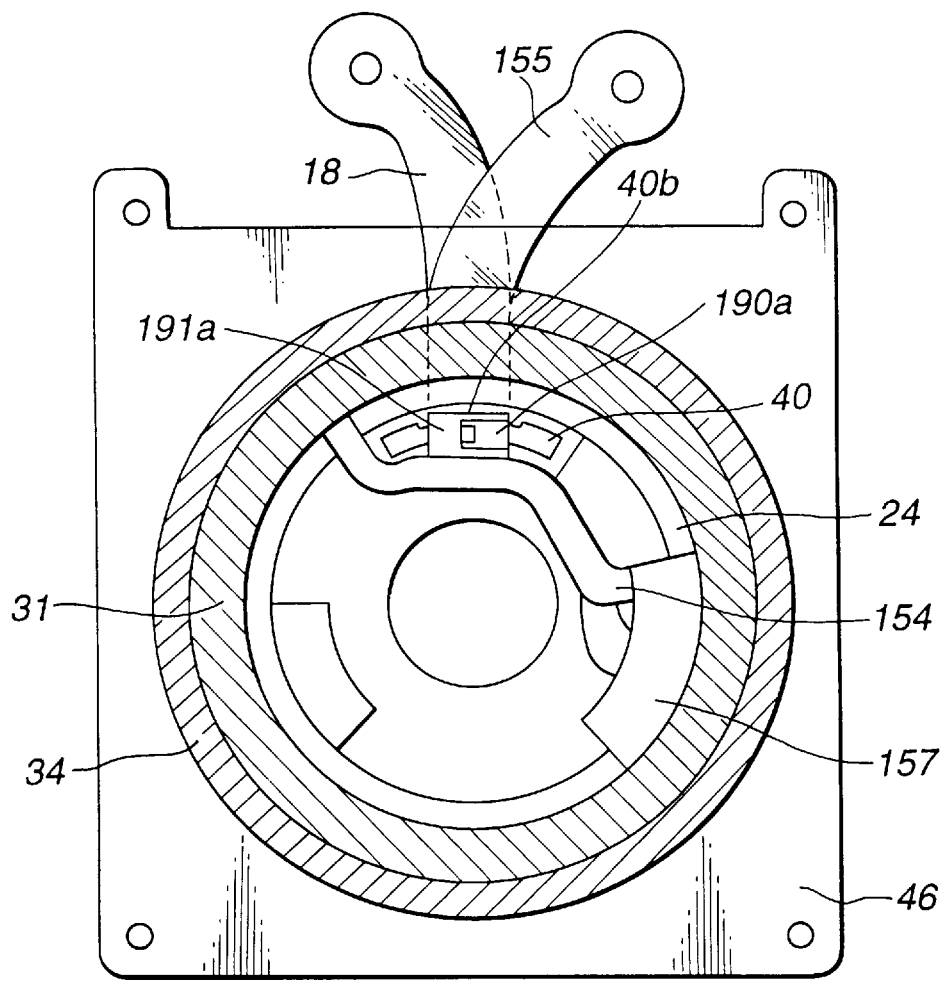
FIG. 16 is a front view, partly in cross section, of the lens barrel of the above embodiment when viewed from a front side.
Figure 17:
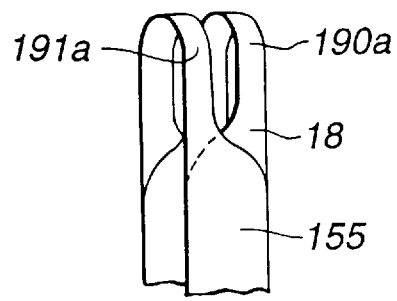
FIG. 17 is an enlarged perspective view showing the U-shaped bent portion of a flexible printed substrate of the above embodiment.

In the retracted state and at the telephoto end, these two flexible printed substrates 18, 155 are disposed so that they do not overlap each other at the U-shaped bent portions thereof as shown in FIG. 16 and FIG. 17 in more detail.

More specifically, the flexible printed substrate for diaphragm 18 and the lens drive flexible printed substrate 155 have narrow width portions 190a, 191a, respectively which are arranged such that one of them is disposed by being biased on the right side and the other is disposed by being biased on the left side at the U-shaped bent portions so that they do not overlap each other in a thickness direction.

With this arrangement, even if the first zoom frame 31 and the fourth group frame 13 move, a resistance applied the U-shaped bent portions can be reduced.

Further, a fine gap is formed between the narrow width portion 190a at the U-shaped bent portion of the lens drive flexible printed substrate 155 and the narrow width portion 191a at the U-shaped bent portion of the flexible printed substrate for diaphragm 18 so that no friction is generated by the contact between flexible printed substrates.

Further, a lubrication processing may be applied to the portion where the lens drive flexible printed substrate 155 is in contact with the flexible printed substrate for diaphragm 18 by coating lubricating grease or the like to a portion thereof to lower a friction resistance therebetween.

Figure 18:
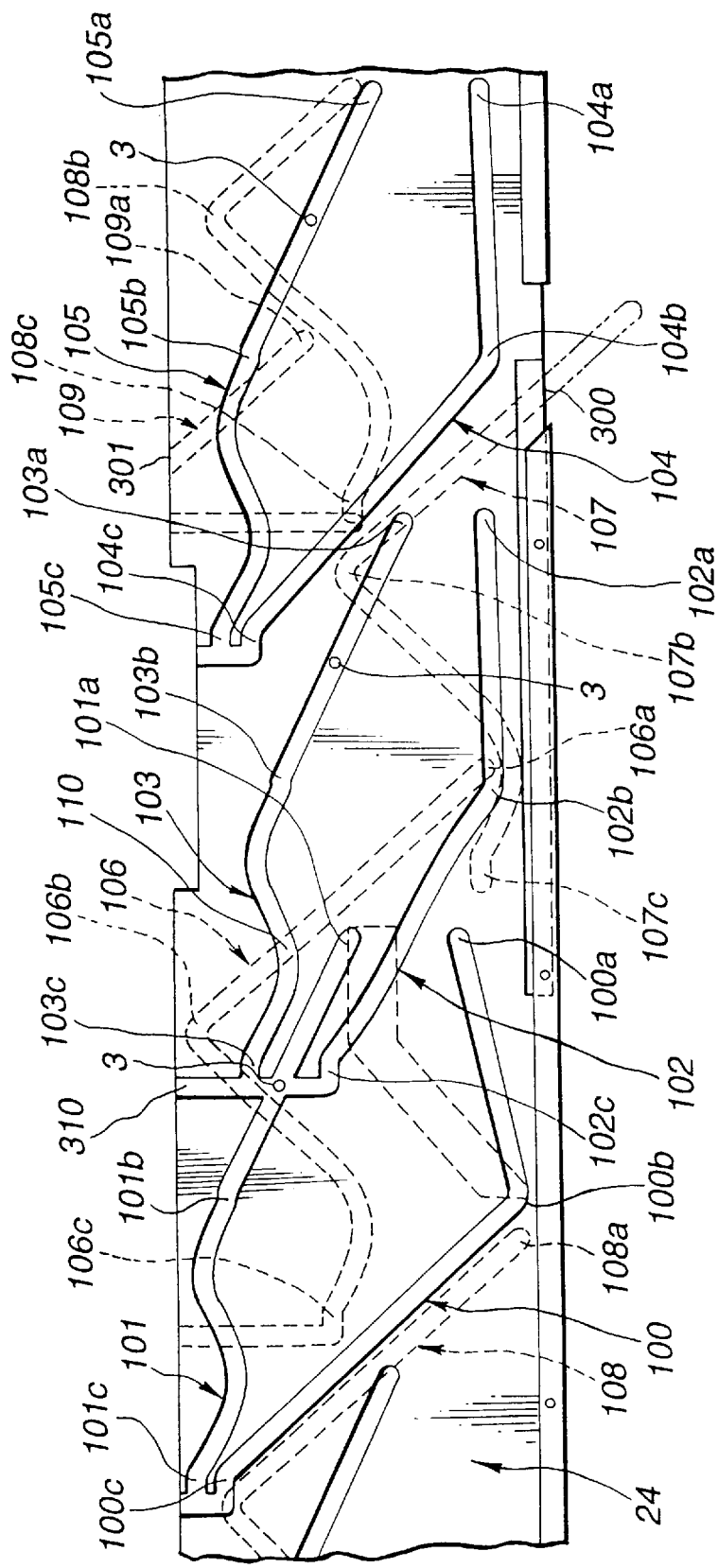
FIG. 18 is a developed view showing a cam provided with a cam frame of the above embodiment.
Figure 19:
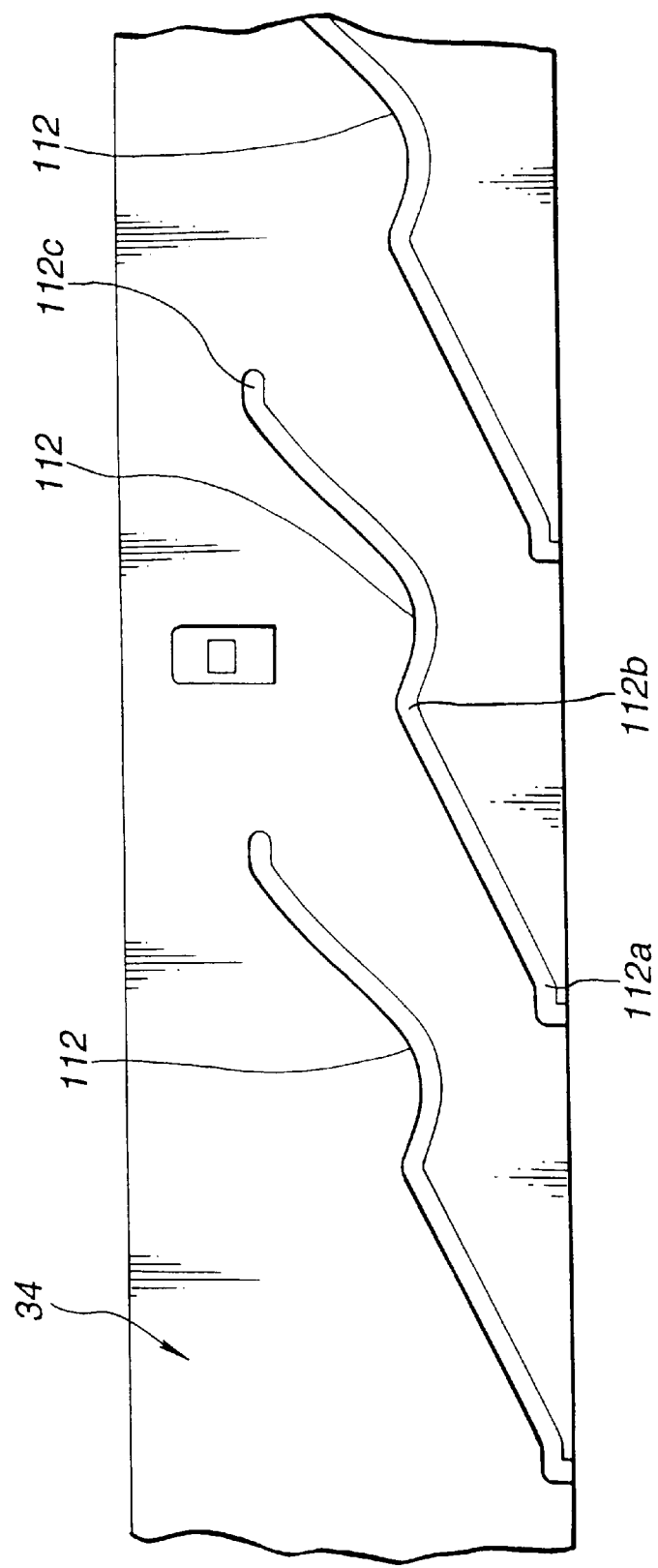
FIG. 19 is a developed view showing a cam provided with a fixed frame of the above embodiment.
Figure 20:
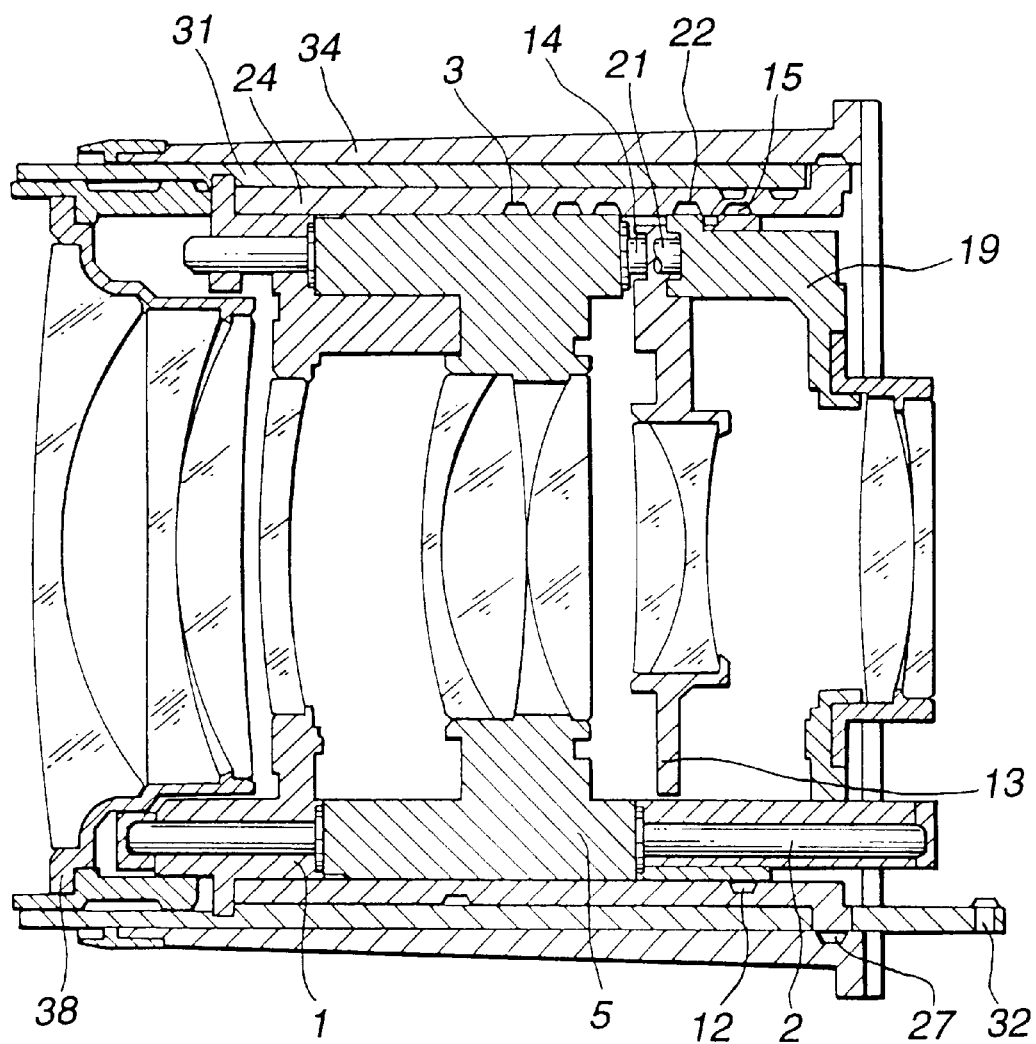
FIG. 20 is a longitudinal cross sectional view along an optical axis showing the lens barrel of the above embodiment when it is retracted.
Figure 21:
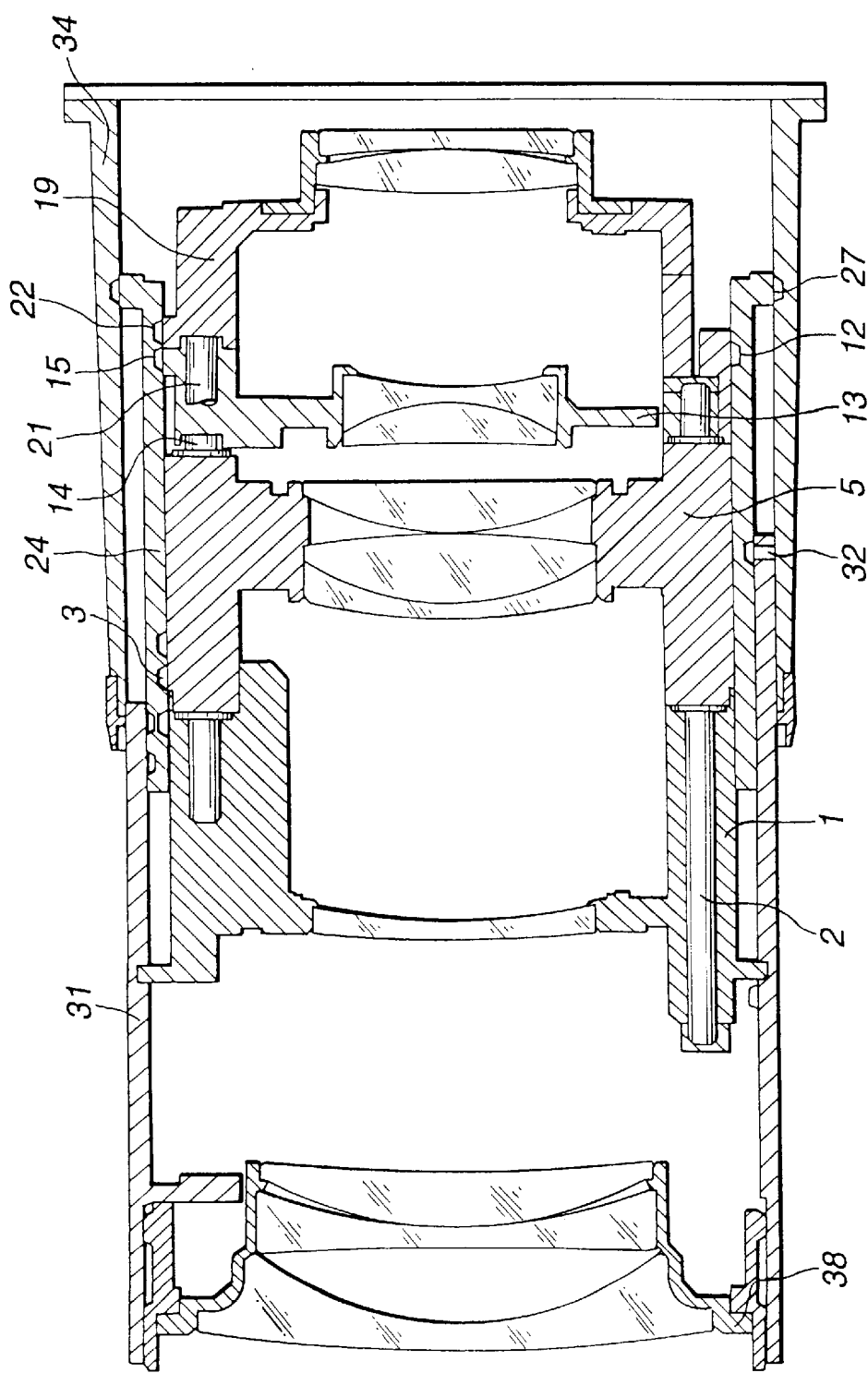
FIG. 21 is a longitudinal cross sectional view along an optical axis showing the lens barrel of the above embodiment located at a wide end.
Figure 22:
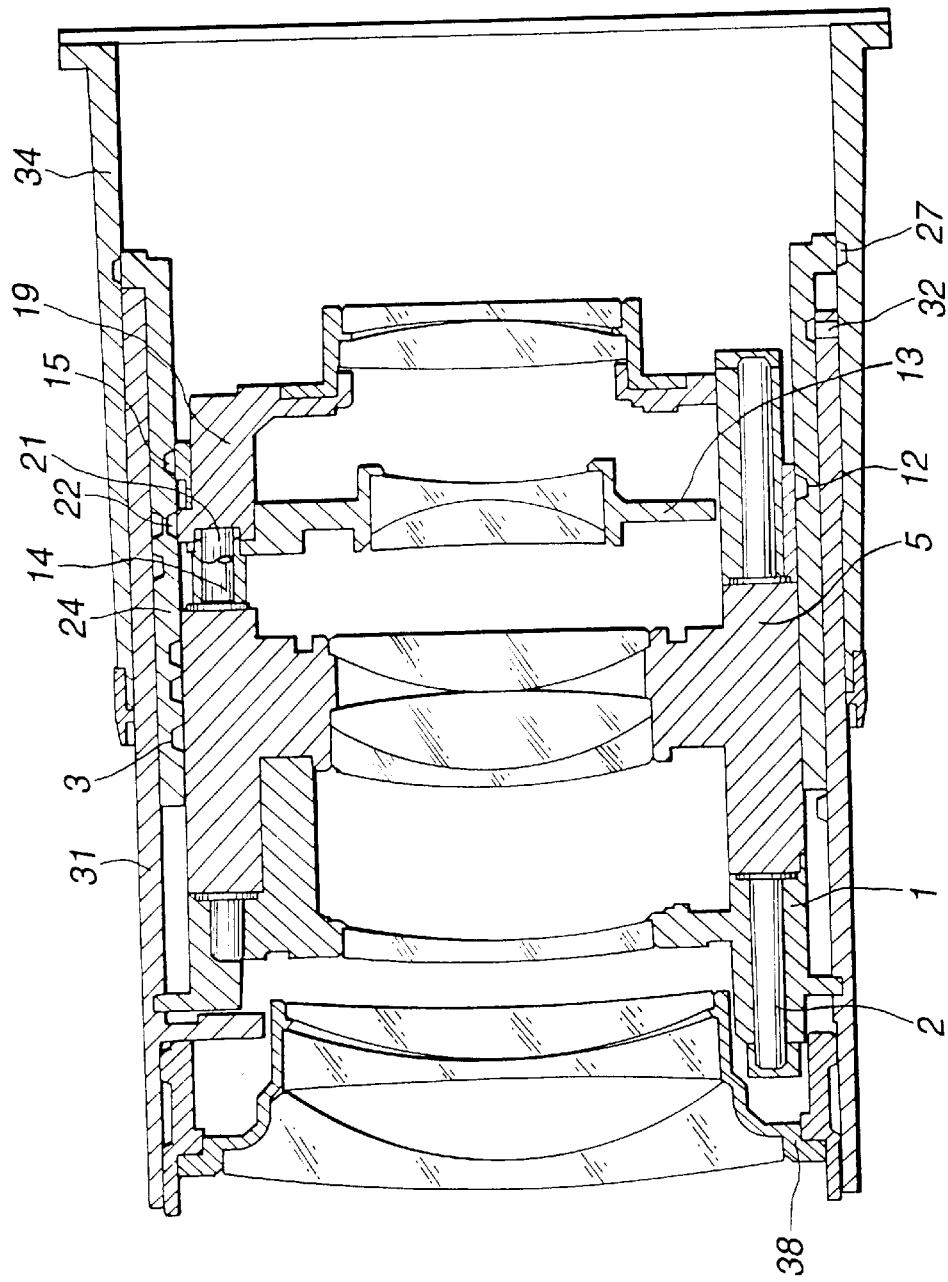
FIG. 22 is a longitudinal cross sectional view along an optical axis showing the lens barrel of the above embodiment in a standard state.
Figure 23:
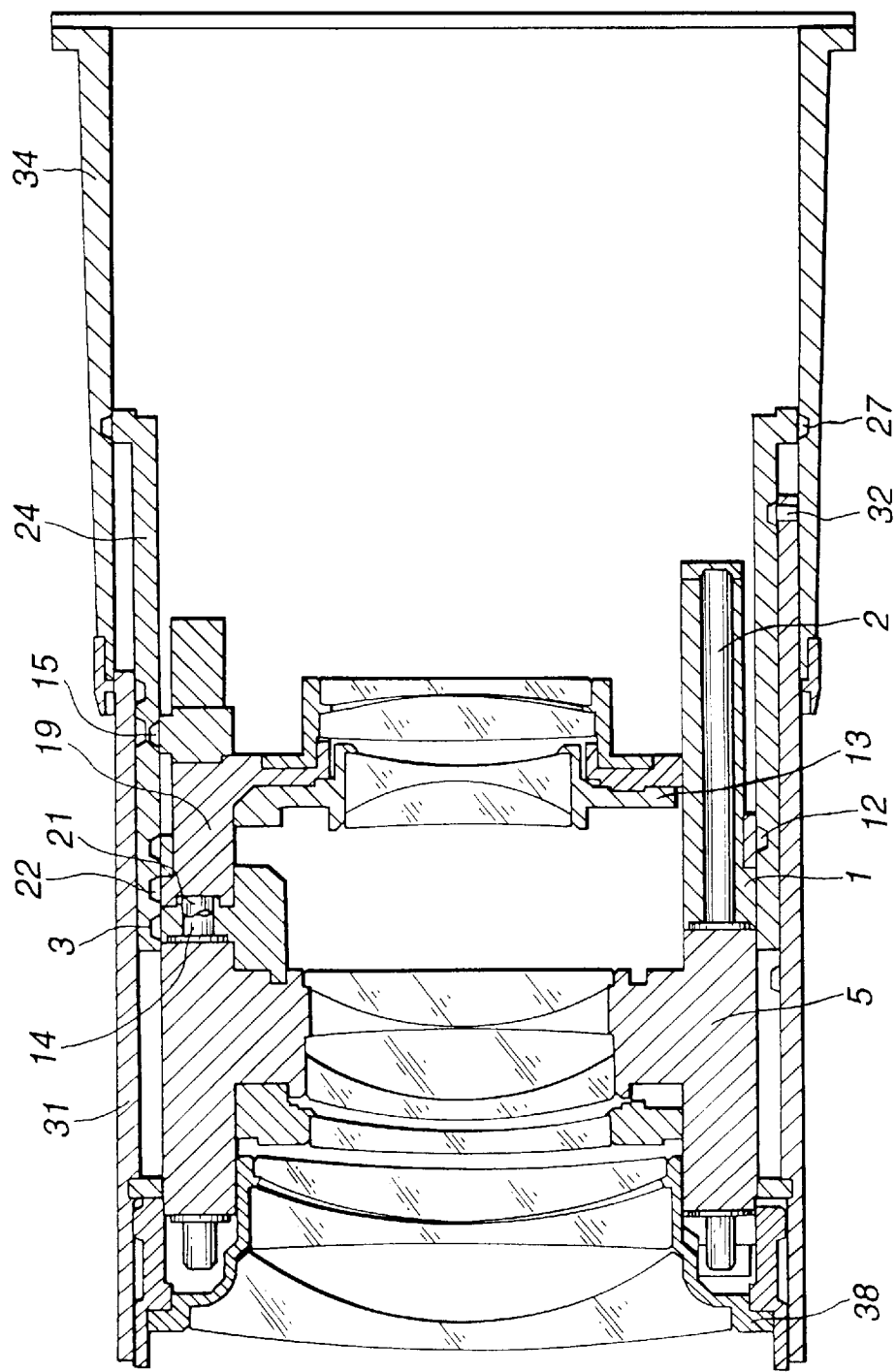
FIG. 23 is a longitudinal cross sectional view along an optical axis showing the lens barrel of the above embodiment located at a telephoto end.

FIG. 18 is a developed view showing the cam disposed on the cam frame 24 and FIG. 19 is a developed view showing the cam disposed on the fixed frame 34. FIG. 20 is a longitudinal cross sectional view along an optical axis showing the lens barrel in a retracted state, FIG. 21 is a longitudinal cross sectional view along an optical axis showing the lens barrel at the wide end, FIG. 22 is a longitudinal cross sectional view along an optical axis showing the lens barrel in the standard state, and FIG. 23 is a longitudinal cross sectional view along an optical axis showing the lens barrel at the telephoto end.

As shown in FIG. 18, the bottomed cam 26 disposed on the inner circumference of the cylindrical cam frame 24 is composed of six bottomed cams 100, 101, 102, 103, 104 and 105 when described in more detail, whereas the bottomed cam 25 disposed on the outer circumference thereof is composed of four bottomed cams 106, 107, 108 and 109 when described in more detail.

The cams 101, 103 and 105 of the cams on the inner circumference have the same cam configuration and are disposed at positions substantially equally divided in a circumferential direction, respectively.

The cam 102 is crosses the cam 101 at a cam follower introducing portion 310.

The cams 106, 107 and 108 disposed on the outer circumference have the same cam configuration and cam 107 is divided at a portion shown by numeral 300 in the midway thereof and disposed as the cam 109 from a portion shown by numeral 301.

Further, holes are drilled at the positions where the cams disposed on the inner circumference cross the cams disposed on the outer circumference. For example, a hole not shown is drilled at the position where the cam 103 on the inner circumference is across the cam 106 on the outer circumference.

The depth of the cam groove of each of the bottomed cams disposed on the cam frame 24 is set such that the sum of the depth of the cam groove on the inner circumference and the depth of the cam groove on the outer circumference is smaller than the wall thickness of the cam frame 24.

The three pins 3 projecting from the circumference of the second group frame 1 are engaged with the three cams 101, 103 and 105, the pin 22 disposed on the fifth group frame 19 is engaged with the cam 100, the pin 15 disposed on the fourth group frame 13 is engaged with the cam 102 and the pin 12 disposed on the third group frame 5 is engaged with the cam 104.

Further, the three pins 50, 51 and 52 integrally disposed on the first zoom frame 31 are engaged with the three cams 106, 108 and 109 on the outer circumference, respectively and the pin 32 disposed on the first zoom frame 31 as a separate member is engaged with the cam 107.

Although the cams 106, 108 are engaged with the pins 50 and 51 in the overall stroke thereof, respectively, the pin 32 is removed from the cam 107 at the portion shown by numeral 300. Substantially at the same time, the pin 52 is engaged with the cam 109 so that the three cams are engaged with the three pins at all times in the cam frame 24 and the first zoom frame 31.

On the other hand, the three cams 112 each having the same cam configuration are disposed on the inner circumference of the fixed frame 34 at the positions substantially equally divided in a circumferential direction. The three pins 27 projecting from the outer circumference of the cam frame 24 are engaged with these three cams 112, respectively.

When the lens barrel is in the retracted state, the three pins 3 provided with the second group frame 1 are engaged at the positions of cam ends 101a, 103a and 105a, respectively, the pin 12 provided with the third group frame 5 is engaged at the position of a cam end 104a, the pin 15 provided with the fourth group frame 13 is engaged at the position of a cam end 102a and the pin 22 provided with the fifth group frame 19 is engaged at the position of a cam end 100a.

Further, the three pins 50, 51 and 52 provided on the first zoom frame 31 are engaged at the positions of cam ends 106a, 108a and 109a. The pin 27 disposed on the outer circumference of the cam frame 24 is engaged at the position of a cam end 112a.

At that time, the first group frame 38, the second group frame 1, the third group frame 5, the fourth group frame 13 and the fifth group frame 19 have a positional relationship shown in FIG. 20, respectively.

When the cam frame 24 rotates, it moves along the cams 112 of the fixed frame 34, the second group frame 1 moves along the cams 101, 103 and 105 of the cam frame 24, the third group frame 5 moves along the cam 104 of the cam frame 24, the fourth group frame 13 moves along the cam 102 of the cam frame 24, and the fifth group frame 19 moves along the cam 100 of the cam frame 24.

Although the pin 3 disposed on the second group frame 1 is unstable at the position of the cam follower introducing portion 310 where the cam 101 is crosses the cam 103, since the other two pins 3 are engaged with the cams 103, 105, respectively, the cam follower introduction portion 310 can be passed through without serious affect to operation.

When the pins provided with the respective frames pass through a hole such as that denoted by numeral 110 where the cam on the inner circumference of the cam frame 24 is across the cam on the outer circumference thereof, the pin securely moves on the cam because the sum of the depth of the cam groove on the inner circumference side and the depth of the cam groove on the outer circumference side is set smaller than the wall thickness of the cam frame 24 as described above so that the pins are not simultaneously engaged at the hole.

When the lens barrel is located at the zoomed wide end, the three pins 3 of the second group frame 1 are engaged at the positions of inflection points 101b, 103b and 105b, respectively, the pin 12 of the third group frame 5 is engaged at the position of an inflection point 104b, the pin 15 of the fourth group frame 13 is engaged at the position of an inflection point 102b, and the pin 22 of the fifth group frame 19 is engaged at the position of an inflection point 100b.

Further, the pins 50, 51 of the first zoom frame 31 are engaged at the positions of inflection points 106b and 108b, respectively and the pin 32 of the first zoom frame 31 is engaged at the position of an inflection point 107b. In addition, the pin 27 of the cam frame 24 is engaged at the position of an inflection point 112b.

At that time, the first group frame 38, the second group frame 1, the third group frame 5, the fourth group frame 13 and the fifth group frame 19 have a positional relationship shown in FIG. 21, respectively.

When the lens barrel is located at the zoomed telephoto end, the three pins 3 of the second group frame 1 are engaged at the positions of cam ends 101c, 103c and 105c, the pin 12 of the third group frame 5 is engaged at the position of a cam end 104c, the pin 15 of the fourth group frame 13 is engaged at the position of a cam end 102c and the pin 22 of the fifth group frame 19 is engaged at the position of a cam end 100c.

Further, the pins 50 and 51 of the first zoom frame 31 are engaged at the positions of cam ends 106c and 108c, respectively and the pin 32 of the first zoom frame 31 is engaged at the position of a cam end 107c. In addition, the pin 27 of the cam frame 24 is engaged at the position of a cam end 112c.

At that time, the first group frame 38, the second group frame 1, the third group frame 5, the fourth group frame 13 and the fifth group frame 19 has a positional relationship shown in FIG. 23, respectively.

When the lens barrel is in the standard state, the three pins 3 of the second group frame 1 are engaged between the inflection point 101b and the cam end 101c, between the inflection point 103b and the cam end 103c and between the inflection point 105b and the cam end 105c, respectively, the pin 12 of the third group frame 5 is engaged between the inflection point 104b and the cam end 104c, the pin 15 of the fourth group frame 13 is engaged between inflection point 102b and the cam end 102c, and the pin 22 of the fifth group frame 19 is engaged between the inflection point 100b and the cam end 100c.

Further, the pins 50 and 51 of the first zoom frame 31 are engaged between the inflection point 106b and the cam end 106c and between the inflection point 108b and the cam end 108c, respectively and the pin 32 of the first zoom frame 31 is engaged between the inflection point 107b and the cam end 107c. In addition, the pin 27 of the cam frame 24 is engaged between the inflection point 112b and the cam end 112c.

At that time, the first group frame 38, the second group frame 1, the third group frame 5, the fourth group frame 13 and the fifth group frame 19 have a positional relationship shown in FIG. 22, respectively.

Figure 24:
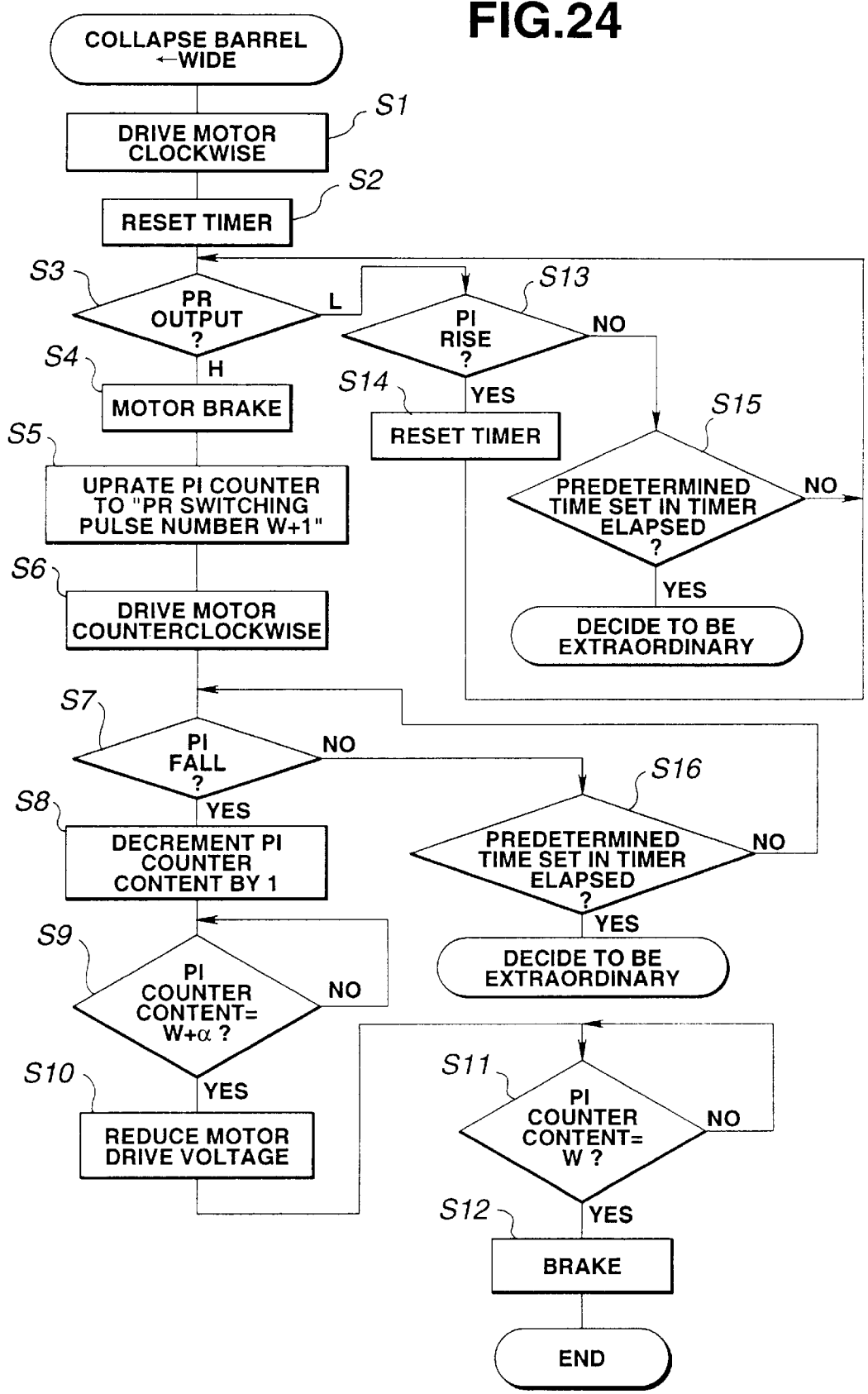
FIG. 24 is a flowchart showing operation when the lens barrel of the above embodiment is zoomed from a retracted state to a wide position.

Next, a diagram for zooming the lens barrel from the retracted state to a wide side will be described with reference to FIG. 24.

When a not shown power switch provided with the camera is turned on, a voltage is applied to the zoom motor 45 to drive it clockwise (step S1). At that time, the lens barrel is displaced in the wide direction and a signal is outputted from the photointerrupter (abbreviated as PI in FIG. 24) 239, a not shown timer is reset (step S2), and the monitor of the photointerrupter 239 and an output from the photoreflector (abbreviated as PR in FIG. 24) 48 is started.

When an output from the photoreflector 48 is switched to high (H) (step S3), braking is applied to the zoom motor 45 (step S4) and it is confirmed by the output from the photointerrupter 239 that the zoom motor 45 is stopped. At that time, the content of the output counter of the photointerrupter 239 is rewritten to the predetermined "number of pulses (W+1) at the switched position of the photoreflector 48" (step S5).

Next, a voltage is applied to the zoom motor 45 to drive it counterclockwise (step S6) and when the falling down (i.e. falling edge) of the photointerrupter 239 is sensed (step S7), the content of the counter of the photointerrupter 239 is decremented by 1 (step S8).

Then, when it is sensed that the content the counter of the photointerrupter 239 becomes W+α which indicates the position just in front of the wide position by an amount corresponding to the given pulse (α) (step S9), a voltage for driving the zoom motor 45 is reduced (step S10) and when it is confirmed that content of the counter of the photointerrupter 239 becomes the predetermined value W after the speed of the lens barrel is reduced (step S11), braking is applied to the zoom motor 45 (step S12) to stop the lens barrel at a target wide position.

Further, when an output from the photoreflector 48 is low (L) at step S3, the rising up (rising edge) of the photointerrupter 239 is sensed (step S13), and when it is sensed, the timer is reset (step S14) and the process returns to step S3. Further, when a predetermined time elapses without sensing the rising up of the photointerrupter 239 (step S15), it is determined to be extraordinary.

Further, when a predetermined time elapses without sensing the falling down of the photointerrupter 239 at step S7 (step S16), it is also determined to be extraordinary.

Figure 25:
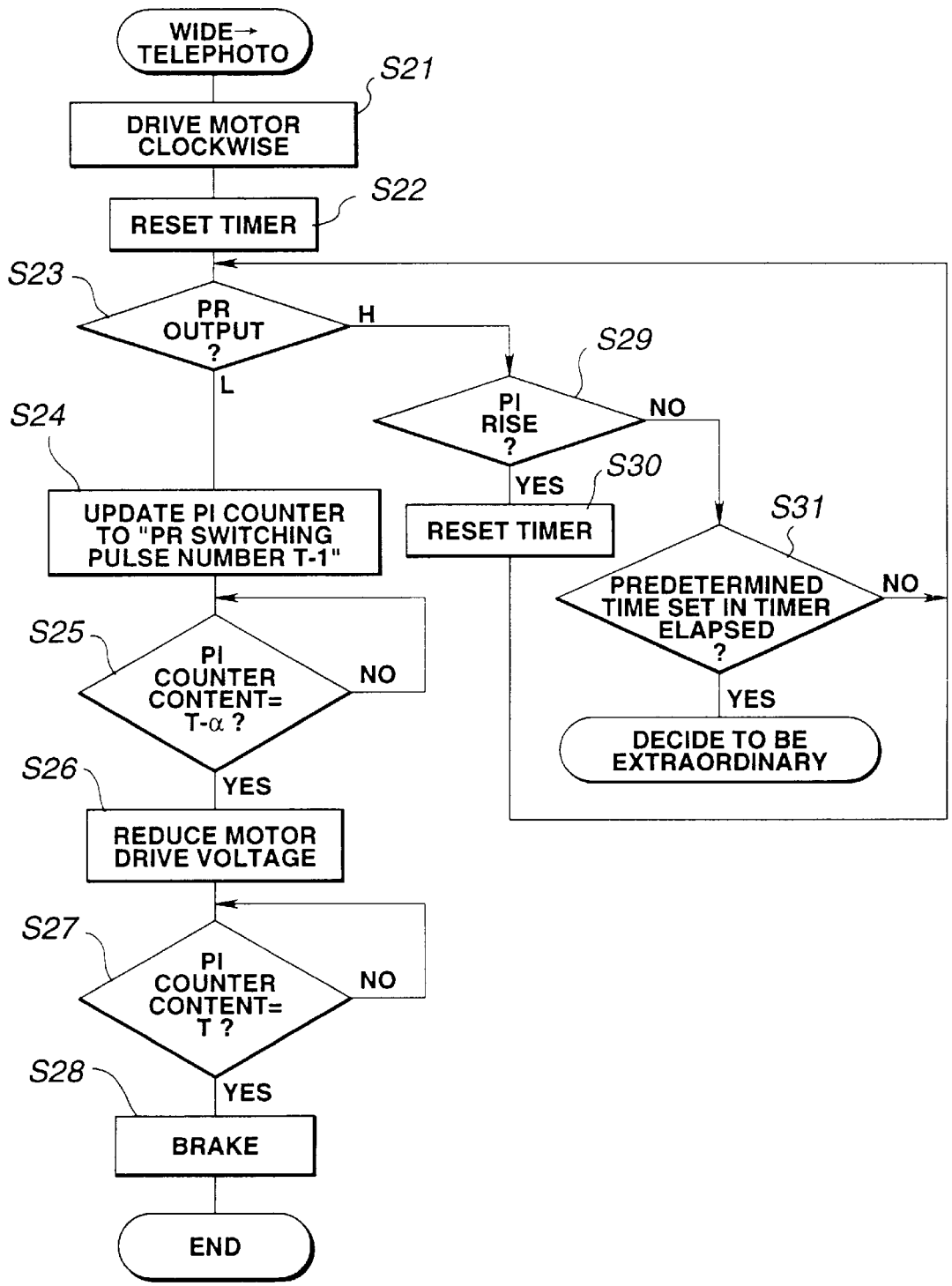
FIG. 25 is a flowchart showing operation when the lens barrel of the above embodiment is zoomed from a wide side to a telephoto side.

Next, a flow for zooming the lens barrel from the wide side to the telephoto side will be described with reference to FIG. 25.

When the not shown power switch provided with the camera is turned on, a voltage is applied to the zoom motor 45 to drive it clockwise (step S21) and the lens barrel starts to be displaced in the telephoto direction. At that time, a signal is output from the photointerrupter 239, the timer is reset (step S22), and the monitor of the photointerrupter 239 and an output from the photoreflector 48 is started.

Although an output from the photoreflector 48 is switched to high (H) in the midway of the process, at that time the content of the output counter of the photointerrupter 239 is rewritten to the predetermined "number of pulses (W+1) at the switched position of the photoreflector 48".

An output from the photoreflector 48 is switched to low (L) in the vicinity of the telephoto side (step S23). At that time the content of the output counter of the photointerrupter 239 is rewritten to the predetermined "number of pulses (T−1) at the switched position of the photoreflector 48" (step S24). When it is sensed that the content of the counter of the photointerrupter 239 becomes T−α which indicates the position just in front of the telephoto position by an amount corresponding to the given pulse (α) (step S25), a voltage for driving the zoom motor 45 is reduced (step S26) and when it is confirmed that content of the counter of the photointerrupter 239 becomes T after the speed of the lens barrel is reduced (step S27), braking is applied to the zoom motor 45 (step S28) to stop the lens barrel at a target telephoto position.

Further, when an output from the photoreflector 48 is high (H) at step S23, the rising up of the photointerrupter 239 is sensed (step S29), and when it is sensed, the timer is reset (step S30) and the process returns to step S23. Further, when a predetermined time elapses without sensing the rising up of the photointerrupter 239 (step S31), it is determined to be extraordinary.

Figure 26:
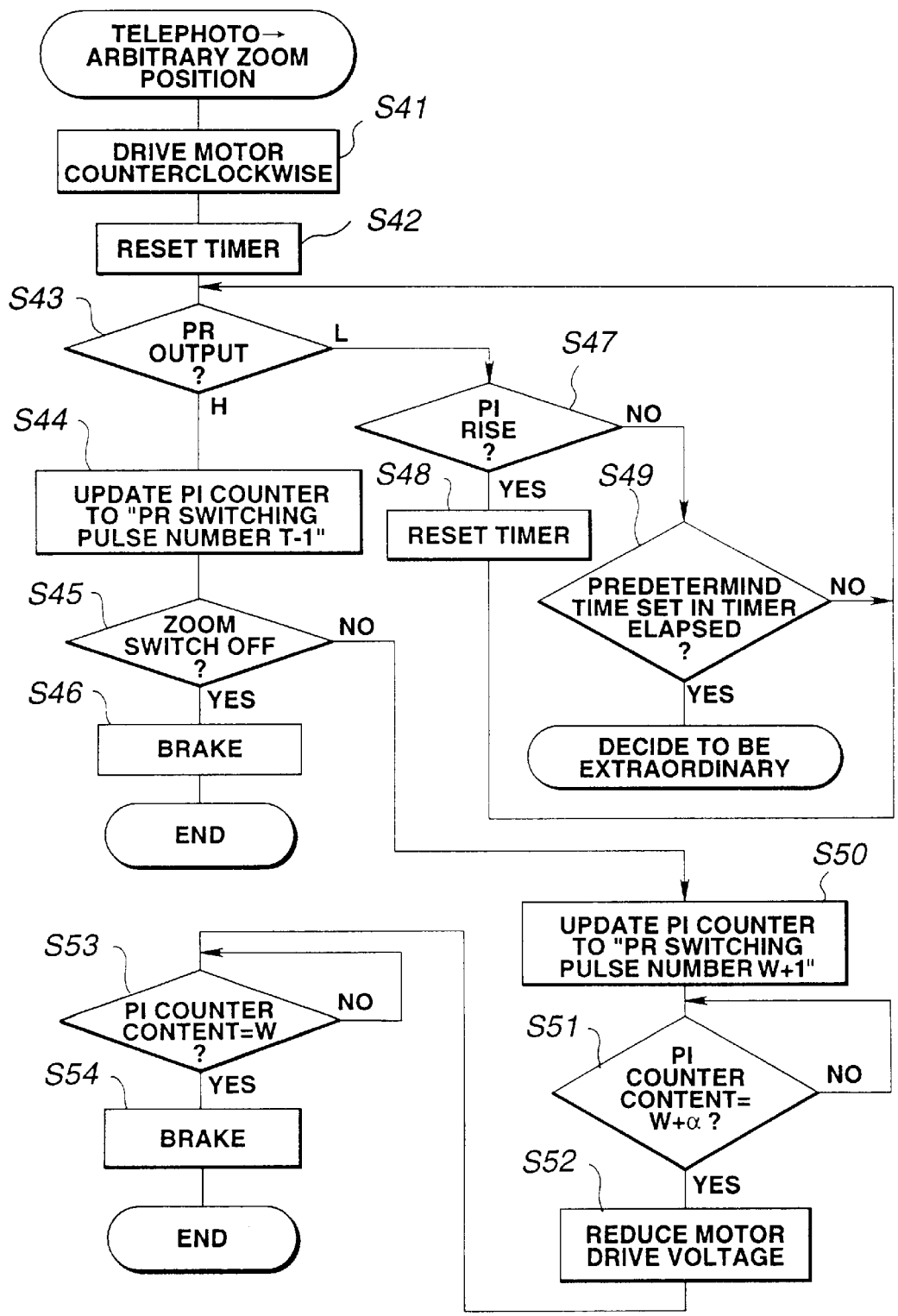
FIG. 26 is a flowchart showing operation when the lens barrel of the above embodiment is zoomed from the telephoto side to an arbitrary zoomed position.

Next, a flow for zooming the lens barrel from the telephoto side to an arbitrary zoom position will be described with reference to FIG. 26.

When a zoom switch is turned on, a voltage is applied to the zoom motor 45 to drive it counterclockwise (step S41) and the lens barrel starts to be displaced in the wide direction. At that time, a signal is output from the photointerrupter 239, the timer is reset (step S42), and the monitor of the photointerrupter 239 and an output from the photoreflector 48 is started.

When it is sensed in the midway of the process that an output from the photoreflector 48 is switched to high (H) (step S43), the content of the output counter of the photointerrupter 239 is rewritten to the predetermined "number of pulses (T−1) at the switched position of the photoreflector 48" (step S44). Thereafter, when the zoom switch is turned off in the midway of the process (step S45), braking is applied to the zoom motor (step S46) to stop the lens barrel.

When the zoom switch is not turned off in the midway of the zooming process (step S45), an output from the photoreflector 48 is switched to low (L) at a position Just in front of the wide position. At that time the content of the output counter of the photointerrupter 239 is rewritten to the predetermined "number of pulses (W +1) at the switched position of the photoreflector 48" (step S50).

When it is sensed that the content of the counter of the photointerrupter 239 becomes W+α which indicates the position just in front of the wide position by an amount corresponding to the given pulse (α) (step S51), a voltage for driving the zoom motor 45 is reduced (step S52) and when the content of the counter of the photointerrupter 239 becomes W after the speed of the lens barrel is reduced (step S53), brake is applied to the zoom motor 45 (step S54) to stop the lens barrel at a target wide position.

Further, when an output from the photoreflector 48 is low (L) at step S43, the rising up of the photointerrupter 239 is sensed (step S47), and when it is sensed, the timer is reset (step S48) and the process returns to step S43. Further, when a predetermined time elapses without sensing the rising up of the photointerrupter 239 (step S49), it is determined to be extraordinary.

Figure 27:
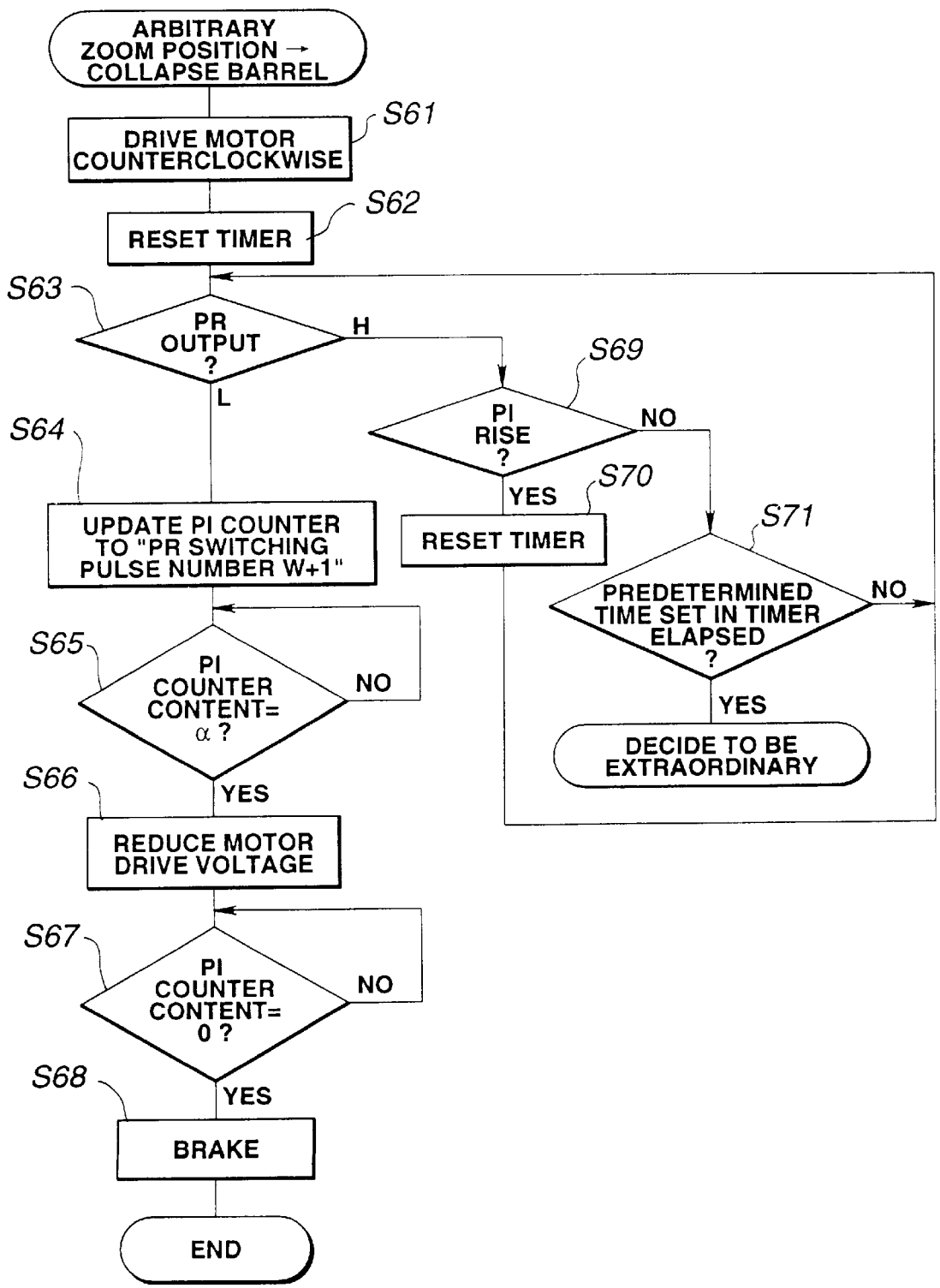
FIG. 27 is a flowchart showing operation when the lens barrel of the above embodiment is retracted.

Next, a flow when the lens barrel is retracted will be described with reference to FIG. 27.

When the power switch is turned on, a voltage is applied to the zoom motor 45 to drive it counterclockwise (step S61) and the lens barrel starts to be displaced in a retracting direction. At that time a signal is output from the photointerrupter 239, the timer is reset (step S62), and the monitor of the photointerrupter 239 and an output from the photoreflector 48 is started.

When an output from the photoreflector 48 is low (L) (step S63), the content of the output counter of the photointerrupter 239 is rewritten to the predetermined "number of pulses (W+1) at the switched position of the photoreflector 48" (step S64).

When it is sensed that the content of the counter of the photointerrupter 239 becomes a which indicates the position just in front of the retracted position by an amount corresponding to the given pulse (α) (step S65), a drive voltage applied to the zoom motor 45 is reduced (step S66) and when it is sensed that the content of the counter of the photointerrupter 239 becomes 0 after the speed of the lens barrel is reduced (step S67), braking is applied to the zoom motor 45 (step S68) to stop the lens barrel at a target retracted position.

Further, when an output from the photoreflector 48 is high (H) at step S63, the rising up of the photointerrupter 239 is sensed (step S69), and when it is sensed, the timer is reset (step S70) and the process returns to step S63. Further, when a predetermined time elapses without sensing the rising up of the photointerrupter 239 (step S71), it is determined to be extraordinary.

As described above, according to the embodiment, since there are provided the fixed frame having the internal cam, the cam frame for moving the lens barrel group holding frames in the optical axis direction while being rotated by the internal cam on the inner circumference side thereof, the long shaft pinion gear for driving the internal gear of the cam frame and the key member for regulating the rotation of the lens group holding frames, to lens barrel having a large amount of movement in the optical axis direction can be realized by the smaller number of frames and thus when the lenses are retracted, the length of the lens barrel can be shortened.

With respect to the disposition of the cams of the cam frame, since the bottomed cams are disposed on both sides of the frame, i.e. on the inner circumference and the outer circumference and the cams are disposed in such a manner that the cams on the inner circumference are across the cams on the outer circumference at at least one position and one of the cams is divided at at least one position, the cams can be effectively disposed in a small space and the size of the cam frame can be reduced in the optical axis direction. As a result, the size of the zoom lens barrel can be reduced.

With respect to the method of supporting the lens holding frames for holding the lens groups, since the zoom lens barrel provides the bearings with the lens holding frame serving as the reference for supporting the rods, the rods are provided with the other lens holding frames and the rods are disposed at the positions substantially equally divided in a circumferential direction, the rods can be effectively supported in a small space. As a result, the length of the zoom lens barrel can be shortened in the retracted state.

With respect to the flexible printed substrates each having at least one U-shaped bent portion, since a plurality of the flexible printed substrates are arranged such that they do not overlap each other at the U-shaped bent portions, a resistance which is applied to the relatively moving members such as the lens holding frames and the like by the U-shaped bent portions can be reduced and as a result the above members can be smoothly moved.

Further, since the rotation of the frames for holding the lens groups is stopped and the strength of the lens barrel is reinforced by the key composed of the same member, the arrangement of the lens barrel can be simplified. In addition, as a method of stopping rotation, since the lens holding frame whose rotation is stopped by the key regulates the rotation of the other lens holding frames, the rotation of the frames having a large amount of movement can be stopped using a short key, whereby the length of the lens barrel can be shortened in the retracted state.

In this invention, it is apparent that working modes different in a wide range can be formed on this basis of this invention without departing from the spirit and scope of the invention. This invention is not restricted by any specific embodiment except as may be limited by the appended claims.

What is claimed is:

1. A lens barrel including lens frames movable in an optical axis direction, comprises a plurality of flexible printed substrates, wherein ends of said flexible printed substrates are overlapped with a uniform width in the thickness direction of said flexible printed substrates so that said ends are electrically connected to a plurality of the moving lens frames in said lens barrel, the ends of said flexible printed substrates are electrically connected to said moving lens frames and bent in accordance with the movement of said lens frames, and further a plurality of said flexible printed substrates are formed to shapes which are not overlapped with each other at the bent portions thereof.

2. A lens barrel according to claim 1, wherein the bent portion of each of said flexible printed substrates is formed to a U-shape.

3. A lens barrel according to claim 1, wherein the bent portion of each of said flexible printed substrates has a width narrower than that of the portion thereof being overlapped.

4. A lens barrel according to claim 1, wherein each of said flexible printed substrates is a one side flexible printed substrate.

5. A lens barrel according to claim 1, wherein the overlapped portions of said flexible printed substrates are overlapped in the diameter direction of said lens barrel.

6. A lens barrel including lens frames movable in an optical axis direction, comprises a plurality of flexible printed substrates, wherein ends of said flexible printed substrates are overlapped with a uniform width in the thickness direction of said flexible printed substrates so that said ends are electrically connected to the moving lens frames in said lens barrel, respectively, the ends of said flexible printed substrates are electrically connected to at least one of said moving lens frames and bent in accordance with the movement of said lens frame, and further a plurality of said flexible printed substrates are formed to shapes which are not overlapped with each other at the bent portions thereof.

7. A lens barrel according to claim 6, wherein the bent portion of each of said flexible printed substrates is formed to a U-shape.

8. A lens barrel according to claim 6, wherein the bent portion of each of said flexible printed substrates has a width narrower than that of the portion thereof being overlapped.

9. A lens barrel according to claim 6, wherein each of said flexible printed substrates is a one side flexible printed substrate.

10. A lens barrel according to claim 6, wherein the overlapped portions of said flexible printed substrates are overlapped in the diameter direction of said lens barrel.

* * * * *

UNITED STATES PATENT AND TRADEMARK OFFICE
CERTIFICATE OF CORRECTION

PATENT NO : 6,072,643
DATED : June 6, 2000
INVENTOR(S) : Nishio et al.

It is certified that error appears in the above-identified patent and that said Letters Patent are hereby corrected as shown below:

At column 7, line 30, after the word "three", delete "linearly" and insert therefor --linear--.

At column 18, line 21, after the word "becomes", delete "a" and insert therefor --α--.

Signed and Sealed this

Seventeenth Day of April, 2001

*Attest:*

NICHOLAS P. GODICI

*Attesting Officer*   *Acting Director of the United States Patent and Trademark Office*